(12) United States Patent
Nakahara et al.

(10) Patent No.: US 11,552,897 B2
(45) Date of Patent: Jan. 10, 2023

(54) REMOTE CONTROL SYSTEM AND METHOD

(71) Applicant: Nippon Telegraph and Telephone Corporation, Tokyo (JP)

(72) Inventors: Yuki Nakahara, Tokyo (JP); Ryota Ishibashi, Tokyo (JP); Takeshi Kuwahara, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/271,050

(22) PCT Filed: Aug. 23, 2019

(86) PCT No.: PCT/JP2019/033170
§ 371 (c)(1),
(2) Date: Feb. 24, 2021

(87) PCT Pub. No.: WO2020/045310
PCT Pub. Date: Mar. 5, 2020

(65) Prior Publication Data
US 2021/0258260 A1 Aug. 19, 2021

(30) Foreign Application Priority Data

Aug. 27, 2018 (JP) .............................. JP2018-158219

(51) Int. Cl.
*H04L 47/283* (2022.01)
*H04L 43/0852* (2022.01)
(Continued)

(52) U.S. Cl.
CPC ........ *H04L 47/283* (2013.01); *H04L 43/0852* (2013.01); *H04L 45/16* (2013.01); *H04L 47/32* (2013.01)

(58) Field of Classification Search
CPC ... H04L 47/283; H04L 43/0852; H04L 45/16; H04L 47/32
See application file for complete search history.

(56) References Cited

U.S. PATENT DOCUMENTS

2018/0124729 A1* 5/2018 Hanson ............. H04W 56/0065

FOREIGN PATENT DOCUMENTS

JP 2017-98661 6/2017

OTHER PUBLICATIONS

Naito et al., "Introduction to Industrial Ethernet," May 1, 2009, pp. 12-17, 9 pages (with English Translation).
(Continued)

*Primary Examiner* — Mandish K Randhawa
(74) *Attorney, Agent, or Firm* — Fish & Richardson P.C.

(57) ABSTRACT

Provided is a remote control system and a method enabling packets, related to a control signal and simultaneously transmitted from a controller to a plurality of controlled devices, to be received by the controlled devices without a difference in delay. Edge nodes that are packet transfer devices are provided on communication paths between a controller provided on a network and a plurality of controlled devices provided in a location. The edge nodes each include a transfer processing unit that transfers the packets from the controller to the controlled devices, and a timing control unit that controls transmission timing of the packets in the transfer processing unit to reduce a difference in arrival time of a plurality of packets simultaneously transmitted from the controller to the plurality of controlled devices, at the plurality of controlled devices.

12 Claims, 17 Drawing Sheets

(51) Int. Cl.
*H04L 45/16* (2022.01)
*H04L 47/32* (2022.01)

(56) References Cited

OTHER PUBLICATIONS

Naito et al., "Introduction to Industrial Ethernet," May 1, 2009, pp. 144-161, 22 pages (with English Translation).
Suzuki et al., "Device-Level IoT with Virtual I/O Device Interconnection," 2016 IEEE 8th International Conference on Cloud Computing Technology and Science (CloudCom), Dec. 12, 2016, pp. 67-74.

* cited by examiner

| GROUP ID | CONTROLLED DEVICE NAME LIST |
|---|---|
| A | DEVICE 1, 2, 3 |
| B | DEVICE 4, 5, 6 |
| C | DEVICE 7, 8, 9 |

| CONTROLLED DEVICE NAME | IP ADDRESS |
|---|---|
| DEVICE 1 | 10. 1. 1. 101 |
| DEVICE 2 | 10. 1. 1. 102 |
| DEVICE 3 | 172. 16. 1. 103 |
| DEVICE 4 | 10. 1. 1. 104 |
| DEVICE 5 | 10. 1. 1. 105 |
| DEVICE 6 | 10. 1. 1. 106 |
| DEVICE 7 | 10. 1. 1. 107 |
| DEVICE 8 | 10. 1. 1. 108 |
| DEVICE 9 | 10. 1. 1. 109 |

Fig. 10

| CONTROLLED DEVICE NAME | EDGE NODE |
|---|---|
| DEVICE 1 | EN1 |
| DEVICE 2 | EN1 |
| DEVICE 3 | EN2 |
| DEVICE 4 | EN1 |
| DEVICE 5 | EN1 |
| DEVICE 6 | EN1 |
| DEVICE 7 | EN1 |
| DEVICE 8 | EN1 |
| DEVICE 9 | EN1 |

Fig. 11

| CONTROLLED DEVICE NAME | EDGE NODE | ONE-WAY DELAY |
|---|---|---|
| DEVICE 1 | EN1 | 1ms |
| DEVICE 2 | EN1 | 1ms |
| DEVICE 3 | EN2 | 5ms |

REMOTE CONTROL SYSTEM AND METHOD

CROSS-REFERENCE TO RELATED APPLICATIONS

This application is a National Stage application under 35 U.S.C. § 371 of International Application No. PCT/JP2019/033170, having an International Filing Date of Aug. 23, 2019, which claims priority to Japanese Application Serial No. 2018-158219, filed on Aug. 27, 2018. The disclosure of the prior application is considered part of the disclosure of this application, and is incorporated in its entirety into this application.

TECHNICAL FIELD

The present invention relates to a remote control system in which a controller on a network controls a plurality of controlled devices provided in a location, and particularly relates to a technique of adjusting the arrival timing of packets, related to a control signal for this purpose, at the controlled devices.

BACKGROUND ART

In the related-art, in an Operational Technology (OT) environment such as a factory, a controller (Programmable Logic Controller (PLC)) and the like that control controlled devices (such as a robot arm, mixer, and thermometer) is provided on the identical network and performs communications with low latency and abundant bandwidth (see Non Patent Literature 1). The communications on the network are performed using a protocol examples of which include PROFIBUS for RS-485 serial communications, Ethernet/IP as an industrial Ethernet (registered trademark) protocol operating on Transmission Control Protocol (TCP), User Datagram Protocol (UDP)/Internet Protocol (IP), and Modbus/TCP as industrial Ethernet (registered trademark) protocol operating on TCP/IP (see Non Patent Literature 1).

PLC has been implemented by software in cities. This enables the PLC to be provided on a so called cloud. In the cities, demonstration experiments (such as air conditioning control) of this mode are conducted.

CITATION LIST

Non Patent Literature

Non Patent Literature 1: Tatsuhiko Naito and one other "Guide to Industrial Internet", first edition, CQ Publishing, May 1, 2009, pages 12 to 16 and 144 to 161

SUMMARY OF THE INVENTION

Technical Problem

A combination of the technique described in Non Patent Literature 1 and the PLC software implementation technique enables a controller provided on the cloud to control controlled devices such as a robot arm for example. Unfortunately, when a controller on a cloud controls a plurality of controlled devices in a location, a communication path between the controller and the controlled device may differ among the controlled devices. In such a case, a difference in delay among the communication paths may be a problem.

For example, the following case is assumed as a case where the communication path between the controller and the controlled device differ among the controlled devices. Specifically, the controlled device has a primary Network Interface Card (NIC) for a wired Local Area Network (LAN) and a secondary NIC for Private Long Term Evolution (LTE), for enabling fallback. The controlled devices in the location are connected to the LAN in the location using the primary NIC. The LAN in the location is connected to a first communication carrier network through an optical fiber line or the like. The first communication carrier network is connected to the Internet. In a normal state, communications between the controller and the controlled device are performed over the first communication carrier network. When a failure of the primary NIC or the like occurs, the controlled device falls back to the secondary NIC, to communicate with the controller over a second communication carrier network providing Private LTE. In such a system, communication paths between the controlled devices in a location and the controller may include one through the first communication carrier network and one through the second communication carrier network.

In such cases, the delay between the communication paths is expected to cause the following problem. An example is considered where a first controlled device communicates over the first communication carrier network and a second controlled device communicates over the second communication carrier network. Furthermore, there is a delay of 80 ms between the controller and a relay device in the first communication carrier network and a delay of 20 ms between the controller and a relay device in the second communication carrier network. In such a case, a gap may occur between the operation timings of the first controlled devices and the second controlled. For example, when arrival of a packet at the first controlled device is delayed by 60 ms from the arrival of a packet at the second controlled device, where the packets are related to operation instructions for the first controlled device and the second controlled device (such as an operation of rotating a turntable (the second controlled device) by 60 degrees and an operation of coloring a part on the turntable by pressing a line marker (the first controlled device)) that are supposed to operate at the timing, the coloring position may be deviated from the target position by a movement for 60 ms.

Examples of a possible solution method for addressing this problem include synchronization processing using infrared communications between the controlled devices and synchronization of execution with the execution timing included in the instruction from the controller under an assumption that the controlled devices are under accurate time synchronization. However, these solutions require additional functions to be provided to all the controlled devices, resulting in problems such as higher cost and higher risk of failure.

Even when a plurality of controlled devices in a location communicate with a controller through the identical communication path, there may still be a difference in delay between a plurality of controlled devices because the packet delay time is not necessarily guaranteed on the communication carrier networks or the Internet.

The present invention is made in view of the above, and an object of the present invention is to provide a remote control system and a method enabling the controlled devices to receive, without a difference in delay, packets related to a control signal and simultaneously transmitted from a controller to a plurality of controlled devices.

Means for Solving the Problem

In order to achieve the above object, the present invention provides a remote control system including a plurality of controlled devices provided in a location, a controller provided on a network and configured to transmit a packet related to a control signal in real time to control the controlled devices, and a packet transfer device provided on one or more communication paths formed between the controller and the plurality of controlled devices. The packet transfer device includes a transfer processing unit configured to transfer a packet from the controller to the controlled devices, and a timing control unit configured to control transmission timing of a packet in the transfer processing unit to reduce a difference in arrival time, at the plurality of controlled devices, of a plurality of the packets simultaneously transmitted from the controller to the plurality of controlled devices.

In an example of a preferred aspect of the present invention, the timing control unit controls the transmission timing of the packet in the transfer processing nit, based on a packet delay time between a packet transfer device of the timing control unit and the controller, and a packet delay time between another packet transfer device, on a communication path different from a communication path on which the packet transfer device of the timing control unit is deployed, and the controller, the packet delay time being received from the other packet transfer device.

In another example of a preferred aspect of the present invention, an adjustment device is further provided on the network and configured to instruct packet transmission time from the packet transfer device, and the timing control unit notifies, upon receiving the packet from the controller, the adjustment device of the reception, receives, from the adjustment device, the packet transmission time, and controls the transfer processing unit to transmit the packet at the packet transmission time.

Effects of the Invention

With the present invention, even when the controller, among the controller and the controlled devices that have existed in the related-art identical LAN, is implemented on the cloud, synchronized operations of the controlled devices can be implemented without providing an additional function to the controlled devices (for example, synchronization processing using infrared communications and synchronization of execution including execution timing assuming accurate time synchronization in each controlled device).

BRIEF DESCRIPTION OF DRAWINGS

FIG. 10 illustrates an example of a device identifier management table.

FIG. 11 illustrates an example of a communication path management table.

DESCRIPTION OF EMBODIMENTS

Overview of the Present Invention

Figure 1:
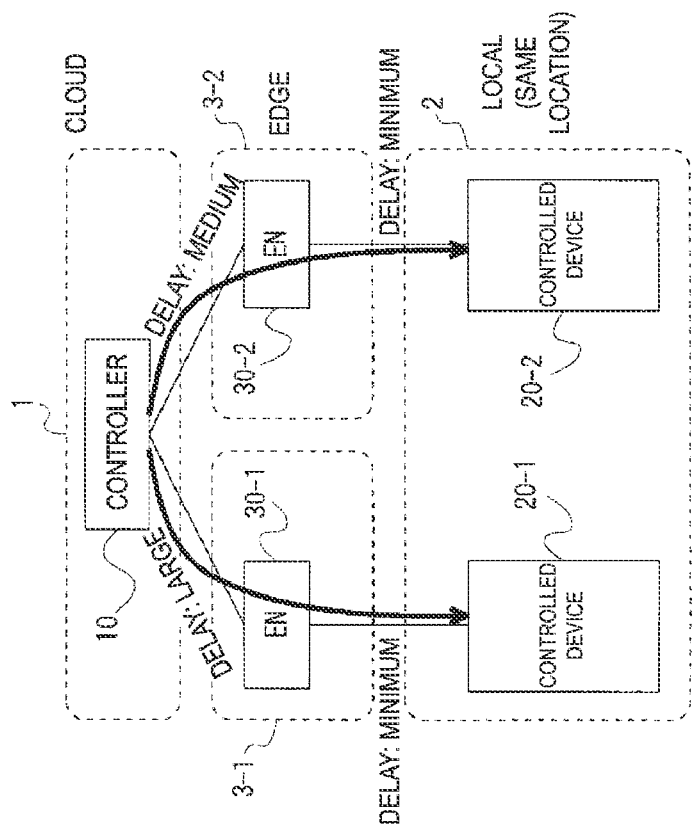
FIG. 1 is a diagram illustrating a configuration of an assumed network environment for a remote control system according to the present invention.

First of all, an overview of a remote control system according to the present invention will be described with reference to the drawings. The description will be first given on an assumed network environment for a remote control system according to the present invention, with reference to FIG. 1. FIG. 1 is a diagram illustrating a configuration of the assumed network environment for the remote control system according to the present invention, Note that in the following description, a plurality of devices and components of the identical type are dented by common main reference signals, and a branch number is provided after the main reference numeral for individually referring to each device/component. Only the main reference numeral is used for collectively referring to a plurality of devices/components of the identical type.

FIG. 1 illustrates an assumed situation of the present invention, where a plurality of controlled devices (such as robot arms) 20 that receive an operation instruction from a controller 10 on a cloud 1 are under different edge nodes 30.

The cloud 1 is a platform that is deployed on the Internet for example and can provide various services, and the controller 10 is implemented on a physical server or a virtual server provided by the cloud 1. Note that the deployment position of the cloud 1 is not particularly limited. Thus, the cloud 1, which can be deployed on the Internet, also can be deployed on a closed network of a communication carrier network, or in an information system managed by a user of the remote control system (this is so-called "on-premises cloud"). The controller 10 controls the controlled devices 20 by real-time transmission of packets, related to control signals, to the controlled devices 20. Here, it should be noted that the controller 10 may simultaneously transmit the packets related to the control signals to the plurality of controlled devices 20, to implement synchronized operations of the controlled devices 20.

The plurality of controlled devices 20 in a local 2 are deployed in the identical location. Upon receiving a packet related to the control signal from the controller 10, the controlled devices 20 each perform various operations on the basis of the control signal.

Edges 3 indicate positions where the edge nodes 30 are deployed in a network configuration of the remote control system as a whole. In a typical example, the edges 3 indicate positions of a network of a communication carrier providing an access line to include the controlled devices 20, and a position on a network of a communication carrier providing the Internet connection service. The edge nodes 30 are devices that are provided on communication paths between the controller 10 and the controlled devices 20, in the edges 3, and transfer the packets therebetween. Specifically, the communication paths between the controlled devices 20 and the controller 10 include at least one communication carrier network. Other modes of the edges 3 and the edge nodes 30 will be described later.

The edge node 30 is mainly composed of a semiconductor device, and can be configured to be what is known as an information processing device including a central processing unit (CPU), a volatile memory such as a random access memory (RAM), a non-volatile memory such as hard disk and flash memory, and a communication network that establishes connection for communications with the external. The edge node 30 may be implemented as dedicated hardware or may be implemented in a virtualized environment built on general-purpose hardware.

In the present invention, the TCP/IP protocols are assumed for the method of transmitting a packet related to a control instruction from the controller 10 on the cloud 1 to the controlled terminal 20. Specifically, industrial Ethernet protocols such as Ethernet/IP, Modbus/TCP, as well as protocols such as Hypertext Transfer Protocol (HTTP) Rest may be used, for example. According to these protocols, TCP or UDP are commonly used for a transport layer. Also in the present invention, it is assumed that TCP or UDP is used.

Note that, in the present invention, a method of handling packets according to a control instruction is described. When a UDP packet is used, a single packet is transmitted and handled unlike the case of TCP. On the other hand, when a TCP packet is used, a TCP session is established before or immediately before the packet including the control instruction is transmitted. When TCP packets are used in the present invention, processing is executed on the control instruction packet using the session, assuming that the TCP session has been established.

Figure 2:
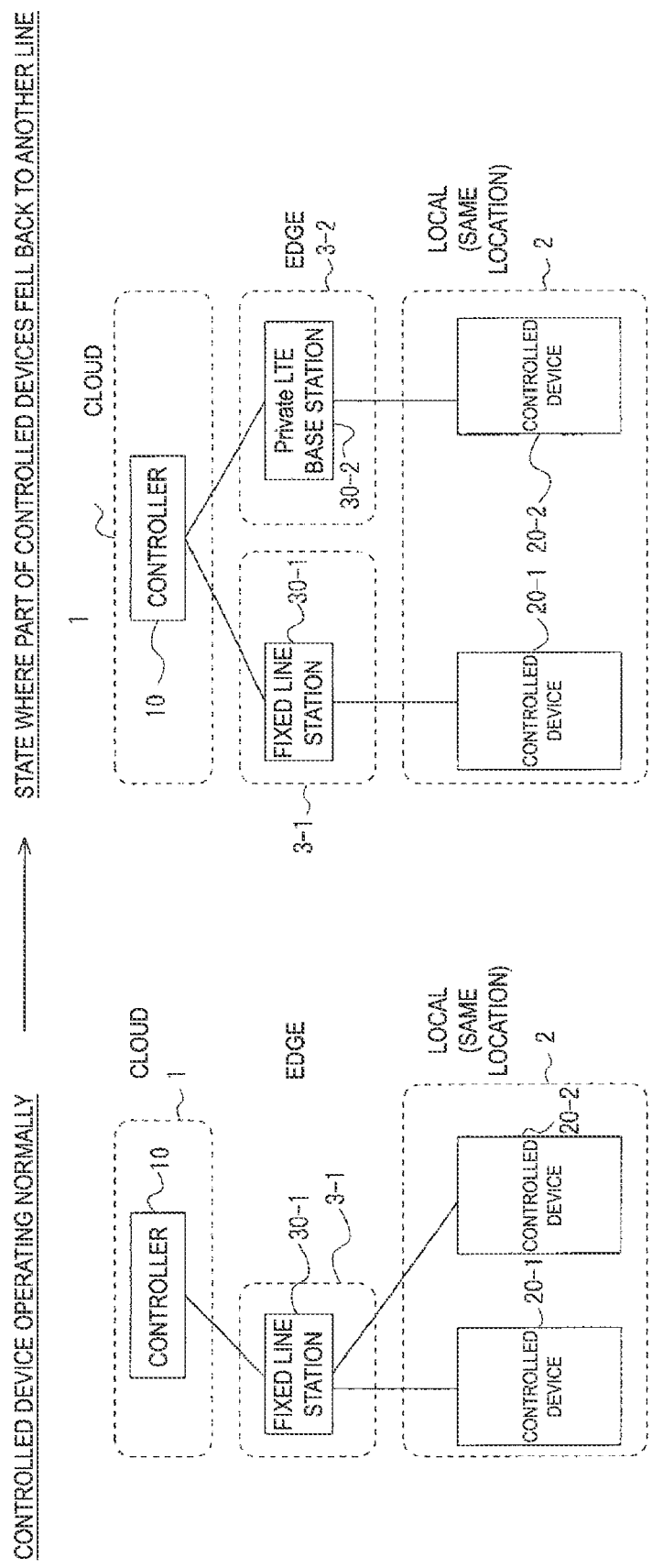
FIG. 2 is a diagram illustrating a change in the assumed network environment according to the present invention.

In the present invention, a case is assumed in which the plurality of controlled devices 20 in a location communicate over different communication paths, that is, via different edges 3. FIG. 1 illustrates an assumed example where one controlled device 20-1 communicates with the controller 10 via an edge 3-1 connected through a fixed line, and one controlled device 20-2 communicates with the controller 10 via an edge 3-2 connected through a mobile line such as LTE. As an example, a case as illustrated in FIG. 2 is conceivable where, under assumption that all of the controlled devices 20 in the location are communicating with the controller 10 via the edge 3-1, some of the controlled devices 20 fall back to the edge 3-2 on a different line, due to a failure of an NIC (wired LAN) therein. Note that, the fallback destination line is not limited to a normal LTE, and may be wireless lines corresponding to different standard/generation such as a femtocell and Private LTE, or corresponding to a different operator. Furthermore, the fallback destination line may be a fixed line (wired line) different from the line before the fallback.

In the present invention, as illustrated in FIG. 1, it is assumed that the delay that occurs between the cloud 1 and the edges 3 (including the Internet section) is large and the delay differs among the communication paths. On the other hand, it is assumed that the delay between the edge 3 and the controlled devices 20 is sufficiently small and does not largely differ among the communication paths.

The present invention assumes the network environment described above, and reduces a difference in signal arrival time between the plurality of controlled devices 20 under this network environment, through buffering (Scheme 1 described later) or synchronization (Scheme 2 described later) of the packets related to the control signal, in the edge nodes 30. In other words, the difference in delay is reduced upon the packet transfer on the network side, so that the controlled devices 20 can receive the packets related to the control instruction from the controller 10 at the identical timing. With this configuration, even when the controller 10, among the controller 10 and the controlled devices 20 that have existed in the identical LAN, is implemented on the cloud, synchronized operations of the controlled devices 20 can be implemented without providing an additional function to the controlled devices 20 (for example, synchronization processing using infrared communications and synchronization of execution including execution timing assuming accurate time synchronization in each controlled device).

Figure 3:
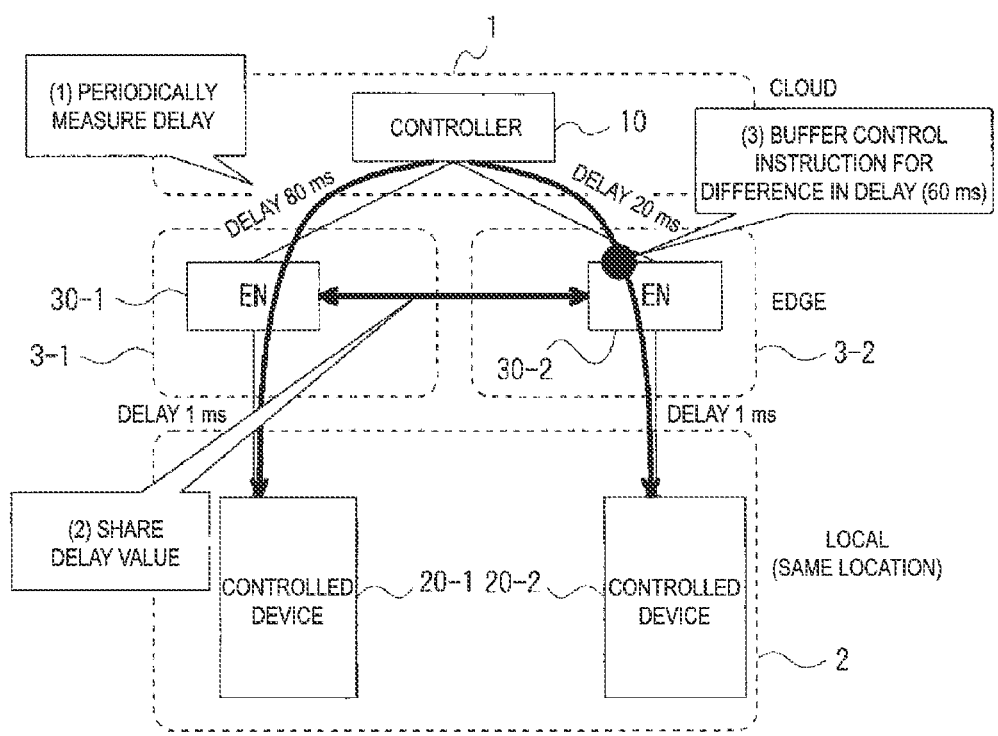
FIG. 3 is a diagram illustrating an overview of a remote control system according to Scheme 1.

Above-mentioned Scheme and Scheme 2 will be described below. First of all, an overview of Scheme 1 is described with reference to FIG. 3. FIG. 3 is a diagram illustrating an overview of a remote control system according to Scheme 1.

Scheme 1

In this Scheme 1, transfer of the received packet is held, and is performed with a delay intentionally added in a communication path involving a small amount of delay, to match the delay in a communication path involving the largest amount of delay, on the basis of the delay values between the cloud 1 and the edges 3, that is, the delay values between the controller 10 and the edge nodes 30 that have been observed. Specifically, the delay values between controller 10 and edge nodes 30 are periodically observed and shared among the edge nodes 30. Then, on the basis of the edge node 30 involving the largest delay, the packets are buffered in the other edge nodes 30 for a period corresponding to a difference in the delay value. Note that in FIG. 3, the means for sharing the delay value between the edge nodes 30 between the controlled devices 20 is omitted. Examples of the sharing means may include Pub/Sub communications via a broker server.

The Scheme 1 provides advantages including: a simple mechanism only requiring a small number of functions; and a short period of time required for the control instruction to reach the controlled devices 20 after being issued from the controller 10 (matching the worst delay value). However, this Scheme 1 is plagued by disadvantages such as low resistance against sudden fluctuation of delay and occurrence of traffic due to delay measurement.

Variation 1 of Scheme 1

Figure 4:
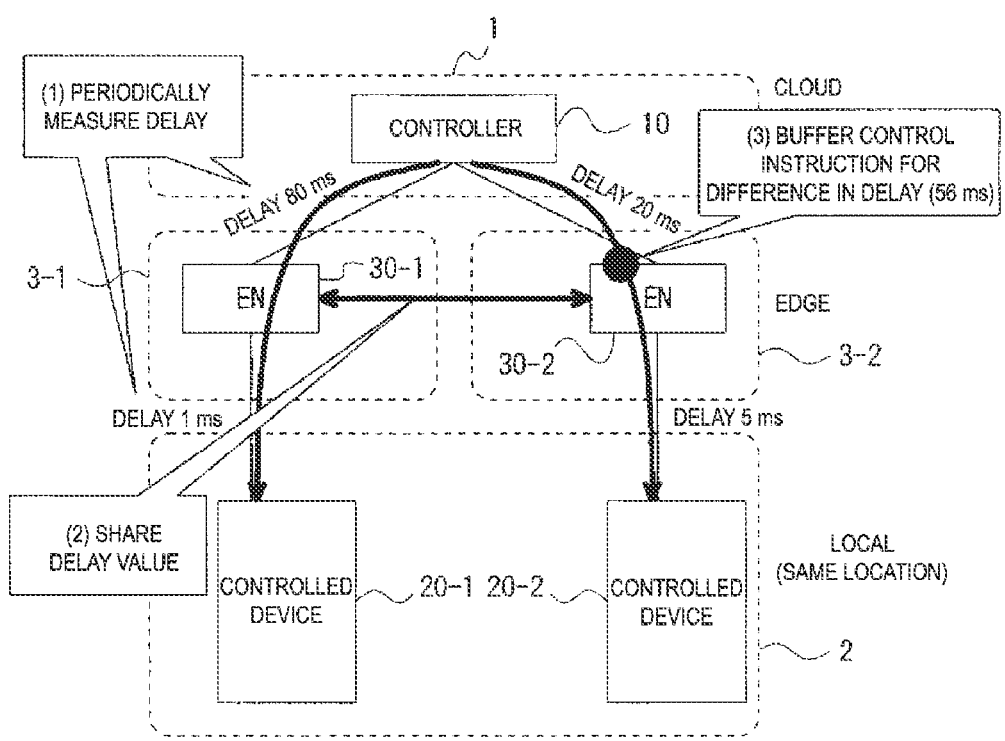
FIG. 4 is a diagram illustrating an overview of a remote control system according to Variation 1 of Scheme 1.

Two variations of above described Scheme 1 are described with reference. First of all, Variation 1 will be described with reference to FIG. 4. FIG. 4 is a diagram illustrating an overview of a remote control system according to Variation 1 of Scheme 1.

Variation 1 is a method achieved by further extending functions of Scheme 1. Specifically, the delay measurement is periodically performed not only between the controller 10 and the edge nodes 30, but also between the edge nodes 30 and the controlled devices 20. The buffering time is determined on the basis of data obtained from both sections.

This variation 1 enables the difference in delay between the communication paths to be more accuracy recognized, so that the control on the controlled devices 20 by the controller 10 can be more accurately implemented. However, this Variation 1 is plagued by disadvantages that the resource consumption becomes so much larger due to a large amount of packets to be measured, in a case where, for example, there is a single controller 10 and multiple (1000 for example) controlled devices 20, compared with a case where the delay measurement is performed only between the controller 10 and the edge nodes 30.

Variation 2 of Scheme 1

Figure 5:
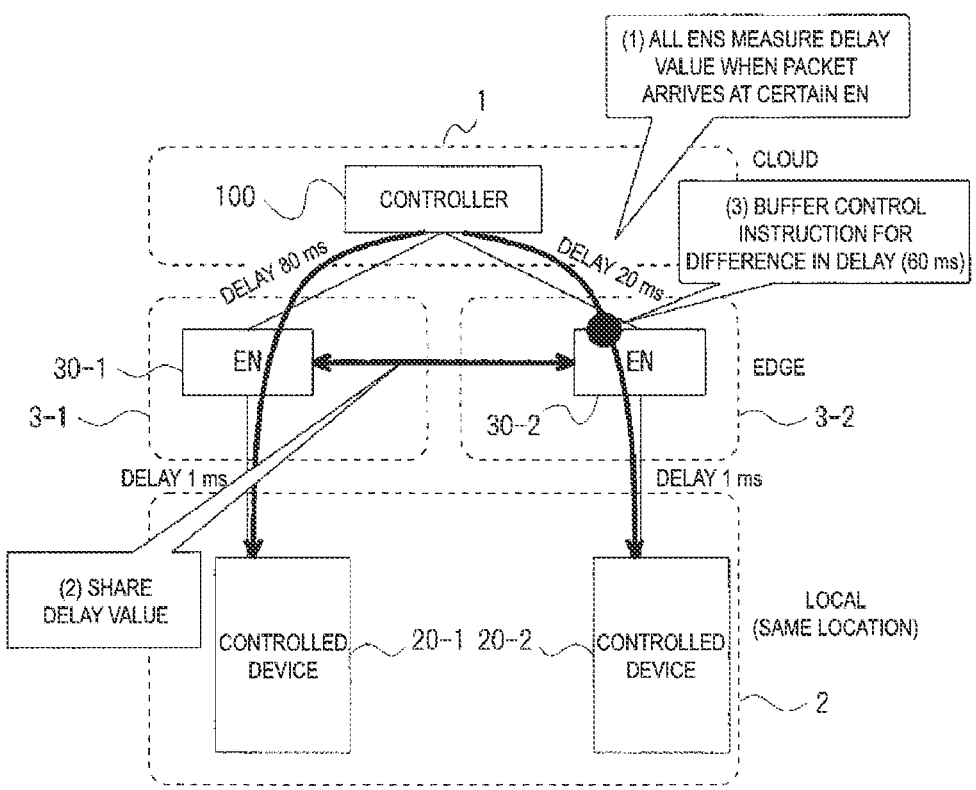
FIG. 5 is a diagram illustrating an overview of a remote control system according to Variation 2 of Scheme 1.

Variation 2 of the present Scheme 1 will be described with reference to FIG. 5. FIG. 5 is a diagram illustrating an overview of a remote control system according to Variation 2 of Scheme 1.

Variation 2 relates to a method including: measuring the delay at the time of arrival of the control instruction packet in addition to/instead of periodically performing delay measurement; and determining the buffering time on the basis of the result of the measurement.

This variation 2 enables the control on the controlled devices 20 by the controller 10 to be more accurately implemented, because the buffering time can be determined on the basis of more recent delay information. On the other hand, this Variation 2 is plagued by a disadvantage that the real-time property of the communications from the controller 10 to the controlled device 20 is slightly compromised, because communications need to be performed with the controller 10 on the cloud 1 and a broker server (not illustrated) at the time of control instruction arrival.

Note that Variation 1 and Variation 2 can be applied in tandem.

Scheme 2

Figure 6:
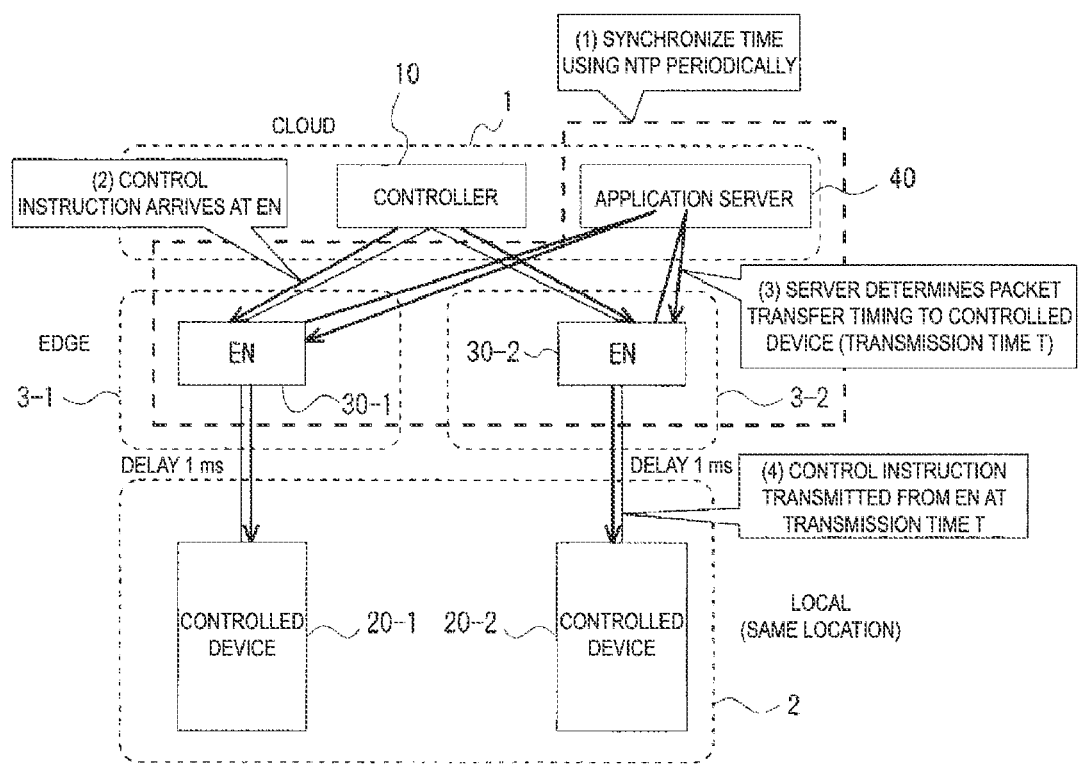
FIG. 6 is a diagram illustrating an overview of a remote control system according to Scheme 2.

Next, an overview of Scheme 2 will be described with reference to FIG. 6. FIG. 6 is a diagram illustrating an overview of a remote control system according to Scheme 2.

Under Scheme 2, transfer of the received packet is held, and the edge nodes 30 cooperate to synchronously transfer the packets related to the control signal to be simultaneously executed, to the controlled devices 20 thereunder. Specifically, as illustrated in FIG. 6, first of all, an application server 40 serving as an adjustment device for adjusting the packet transmission time between controlled devices 20 is deployed on the network. Each edge node 30 and the application server 40 are constantly synchronized in time by means of Network Time Protocol (NTP) and the like. Upon receiving the packet related to the control signal from the controller 10, the edge nodes 30 each notify the application server 40 of the reception of the packet. Then, the application server 40 determines the timing of packet transfer (transmission time T) to the controlled devices 20, and notifies each edge node 30 of the timing. Each edge node 30 transmits the packet when the transmission time T received from the application server 40 arrives.

The present Scheme 2 features advantages such as: being unaffected by delay fluctuation; guaranteed simultaneous transmission of packets to the controlled devices 20 (more effective in a case with a smaller delay between the edges 3 and the local 2); and a small amount of traffic. However, there are disadvantages such as: complicated mechanism requiring the application server 40 for synchronization; and low real-time property due to waiting in the edge nodes 30.

The application server 40 arranged on the same cloud 1 as the controller 10 in the example illustrated in FIG. 6, may alternatively be located at other positions on the network. The present Scheme 2 is also effective in a case where the controlled devices 20 are under a single edge node 30.

In the present invention, a packet transfer device interposed between the controller 10 and the controlled devices 20 is referred to as an edge node. This packet transfer device may be provided at any point on the communication path between the controller 10 and the controlled devices 20. Specifically, the packet transfer device may be installed at a location managed by the communication carrier, or may be located at a location managed by an administrator of the controlled devices 20. Furthermore, the controlled devices 20 may include a function of the packet transfer device according to the present invention. Specific examples of the deployment points are listed below.

Point Of Interface (POI) for connection from a communication carrier network (access provider) to an Internet Service Provider (ISP)

Communication building (such as a telephone exchange station) through which the communication carrier network (access provider) is connected to a Metropolitan Area Network Connection gateway (GW) between a LAN in a user building such as a factory and the communication carrier GW in a certain segment in the LAN in the user building An Ethernet (registered trademark) converter device to which controlled devices in the user building are connected A communication base station (such as an LTE base station or a femtocell base station) managed by a mobile communication carrier, and provided in the user building such as a factory A communication base station (such as a Private LTE base station or a WiFi (registered trademark) access point) managed by the user and provide in the user building such as a factory The controlled device 20 may include this function. However, such a configuration is plagued by a disadvantage that, of the advantages "even when the controller 10, among the controller 10 and the controlled devices 20 that have existed in the related-art same LAN, is implemented on the cloud, synchronized operations of the controlled devices 20 can be implemented without providing an additional function to the controlled devices 20 (for example, synchronization processing using infrared communications and synchronization of execution including execution timing assuming accurate time synchronization in each controlled device)", the advantage "without providing an additional function to the controlled devices 20 (for example, synchronization processing using infrared communications and synchronization of execution including execution timing assuming accurate time synchronization in each controlled device)" cannot be obtained.

Furthermore, the controller 10 may include this function. In this case, Scheme 1 is effective only when Variation 1 is employed, and there is a disadvantage that a large number of delay measurement packets are generated when there are a large number of controlled devices 20. The above described deployment of function can be implemented in a case of Scheme 2, but is substantially meaningless.

A detailed embodiment of the present invention will be described more specifically below.

First Embodiment (Scheme 1)

Figure 7:
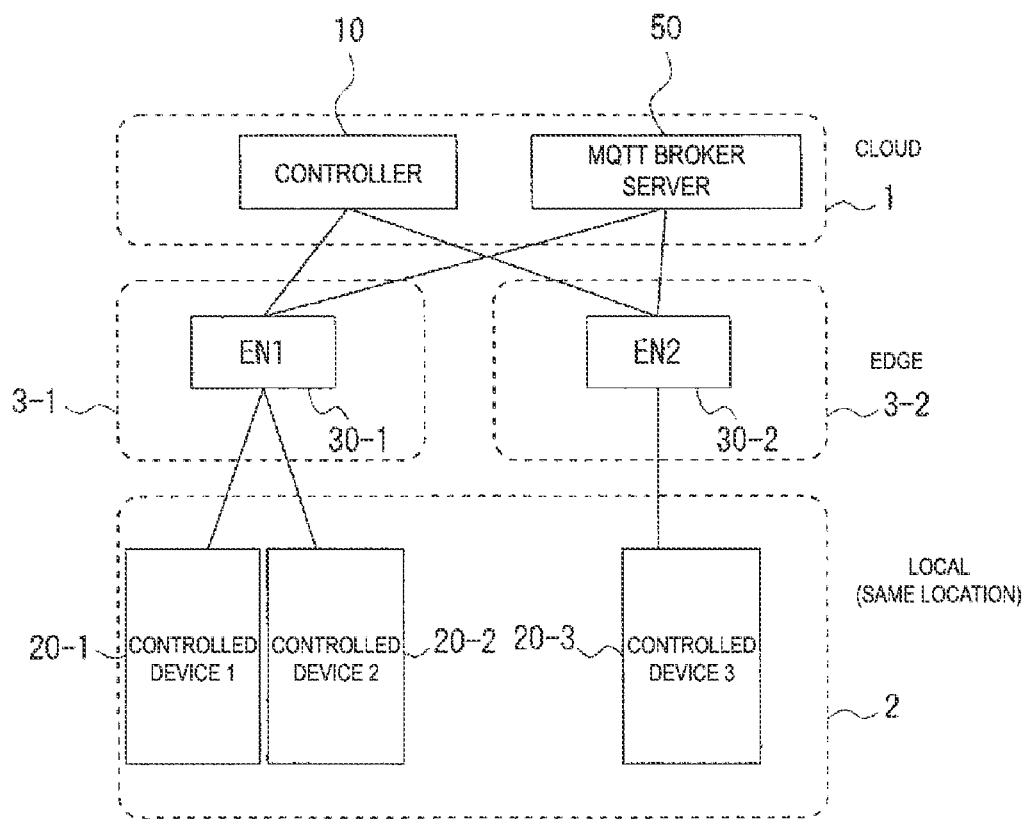
FIG. 7 is a diagram illustrating a configuration of a remote control system according to a first embodiment.

A remote control system according to a first embodiment of the present invention will be described in detail with reference to FIG. 7. FIG. 7 is a diagram illustrating a configuration of the remote control system according to the first embodiment of the present invention. Note that components that are the same as those described in the overview of the present invention above are denoted by the same reference numerals.

Scheme 1 is mainly implemented by the following techniques: (1) a method of logically grouping controlled devices and managing a physical configuration in each edge node 30; (2) a method of generating the management Information and updating the information in response to a change in configuration; (3) a method of managing information about delay between the controller 10 and the edge nodes 30 in each edge node 30; (4) a method of periodically measuring delay between the controller 10 and the edge nodes 30 and sharing the result; and (5) a method of buffering at the time of arrival of packets related to the control signal from the controller 10. Note that "logically grouping controlled devices" means logically grouping the controlled devices 20 to prepare for a case where the plurality of controlled devices 20 are desired to be controlled simultaneously by the controller 10 (examples of assumed cases include a case where rotation of a turntable and descending of an arm are simultaneously performed). The term also refers to the resultant group.

As described above, Scheme 1 includes performing buffering in the edge nodes 30 on the basis of the delay information measured in advance, and thus is effective in a case where a fluctuation of the delay between the cloud 1 and the edges 3 (jitter) is small.

As illustrated in FIG. 7, the remote control system according to the present embodiment includes: a controller 10 arranged in a cloud 1; a plurality (three in FIG. 7) of controlled devices 20 disposed in a local 2, edge nodes 30 disposed in each of a plurality of (two in FIG. 7) edges 3, which are networks for connecting the controlled device 20 with a controller 10; and a Message Queuing Telemetry Transport (MQTT) broker server 50 that is provided on the cloud 1 for sharing information between the edge nodes 30. The MQTT broker server 50 is a device that relays Pub/Sub communications with MQTT. Note that in FIG. 7, the MQTT broker server 50 is deployed on the cloud 1, but may be deployed at any position as long as it can communicate with each edge nodes 30.

The edge nodes 30 are interposed between the controller 10 and the controlled devices 20, and have the following functions. (a) Transferring packets between the controller 10 and the controlled device 20. (b) Periodically measuring the delay time between the controller 10 and the host edge node 30, and recording the content. (c) Communicating with the MQTT broker server 50 and informing the other edge nodes 30 of the measurement results, as well as similarly receiving notification from other edge nodes 30 and recording the content.

Figures 8, 9:
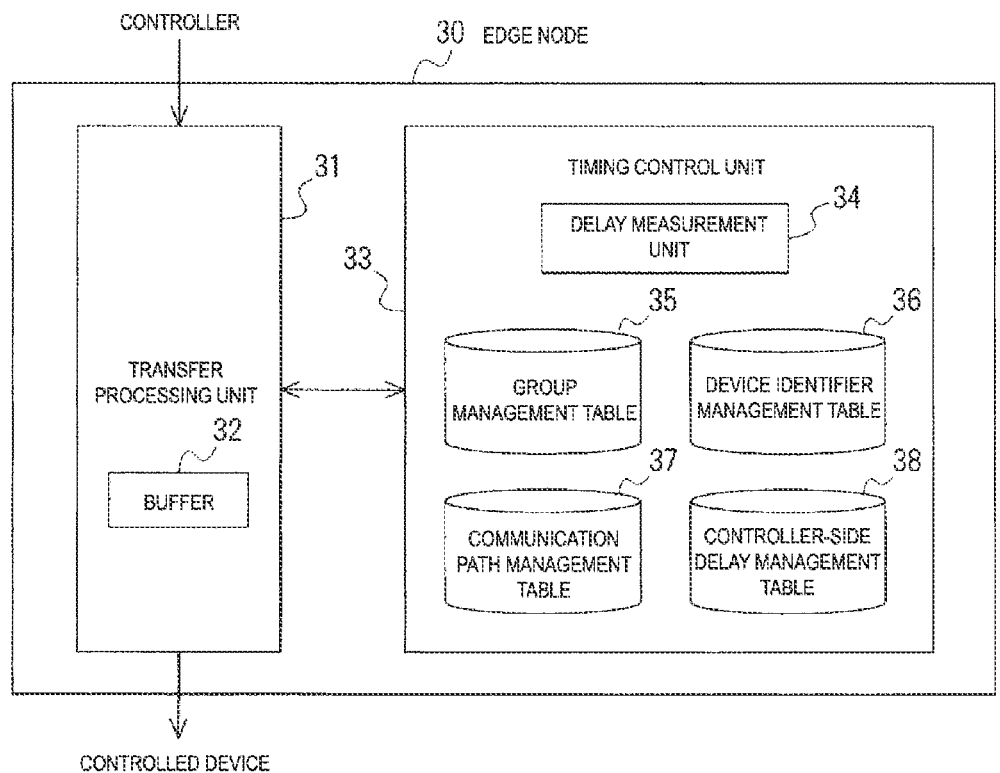
FIG. 8 is a functional block diagram illustrating an edge node according to the first embodiment.
FIG. 9 illustrates an example of a group management table.

To implement the above-described functions, the edge node 30 includes a transfer processing unit 31 and a timing control unit 33, as illustrated in FIG. 8. The transfer processing unit 31 has the function (a) and includes a buffer 32. The timing control unit 33 has the functions (b) and (c), and includes a delay measurement unit 34, a group management table 35, a device identifier management table 36, a communication path management table 37, and a controller-side delay management table 38.

The remote control system according to the present embodiment will be described below by describing each of the configuration techniques (1) to (5) described above.

(1) Method of Logically Grouping Controlled Devices and Managing a Physical Configuration in Each Edge Node 30

As described above, each edge node 30 holds the group management table 35, the device identifier management table 36, and the communication path management table 37, as described above. As illustrated in FIG. 9, the group management table 35 holds, as information, the grouping of controlled devices 20 at which the packets related to the control instruction from the controller 10 need to simultaneously arrive. As illustrated in FIG. 10, the device identifier management table 36 holds the relationship between the name of the controlled device 20 and an identifier (for example, an IP address) of the controlled device 20. As illustrated in FIG. 11, the communication path management table 37 records the edge node 30 on a higher level to which each controlled device 20 is connected. A predetermined character string (for example, EN1) is used as the identifier of the edge node 30.

Figures 12, 13:
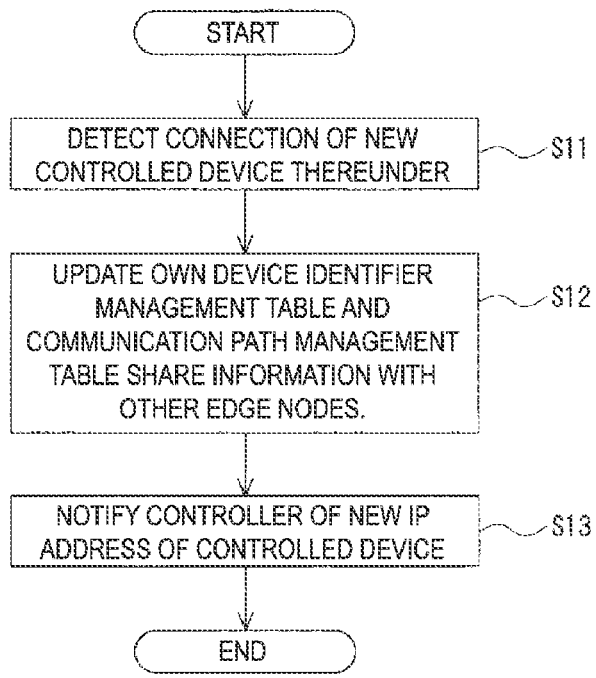
FIG. 12 is a flowchart of update of management information in the edge node.
FIG. 13 illustrates an example of a controller-side delay management table.

(2) Method of Generating the Management Information and Updating the Information in Response to a Change in Configuration The group management table 35, the device identifier management table 36, and the communication path management table 37 are registered in advance in each edge node 30 by manual input. FIG. 12 is a flowchart of update of management information in the edge node 30.

As illustrated in FIG. 12, for example, in a case where the edge node 30 on the upstream side of the controlled device 20 changes due to fallback to another line in response to an NIC failure in the controlled device 20, a new edge node 30 on the upstream side automatically detects the change (step S11) and shares the information with the edge nodes 30, and each edge node 30 updates the tables therein (step S12). At the same time, the new edge node 30 on the upstream side notifies the controller 10 on the cloud 1 of the new IP address of the controlled device 20 (step S13). This allows the controller 10 on the cloud 1 to continue to issue instructions to the controlled devices 20.

A specific sequence of operations for the table update is as follows. Here, an example is described where a controlled device 20-3 among controlled devices 20-1, 20-2, and 20-3 provided under an edge node 30-1 falls back to be under an edge node 30-2.

1. The NIC used in the controlled device 20-3 is changed, and the controlled device 20-3 is newly connected to the line under the edge node 20-2. The controlled device 20-3 sets, for the new NIC, the IP address for the line connection under the edge node 20-2 described in the setting information of the device in advance. In this process, the controlled device 20-3 transmits a Gratuitous Address Resolution Protocol (Gratuitous ARP), for updating a Media Access Control (MAC) address tables and the ARP caches in the network devices in the identical segment.

2. The edge node 30-2 receives Gratuitous ARP, to recognize that the controlled device 20-3 is newly added thereunder. The edge node 30-2 publishes, to the MQTT broker server 50, the new IP address of the controlled device 20-3 and the fact that the controlled device 20-3 has been newly added. At the same time, the edge node 30-2 updates the device identifier management table 36 and the communication path management table 37 therein. Specifically, the edge node 30-2 updates the IP address of the controlled device 20-3 in the device identifier management table 36 to a new IP address. In addition, the edge node corresponding to the controlled device 20-3 in the communication path management table 37 is changed to "EN2" indicating the edge node 30-2.

3. The MQTT broker server 50 notifies each edge node 30, registered for subscription in advance, of the information. As in the step described above, each edge node 30 updates the device identifier management table 36 and the communication path management table 37 therein.

(3) Method of Managing Information about Delay Between Controller 10 and Edge Node 30 in Each Edge Node 30

The edge node 30 holds a one-way delay between the controller 10 on the cloud 1 and each edge node 30 as the controller-side delay management table 38, as described above. FIG. 13 illustrates an example of the controller-side delay management table 38. The one-way delay value on the controller-side delay management table 38 is updated continually according to the method described in the configuration technique (4) described later.

Note that in the method described in the configuration technique (4) described later, a one-way delay value between each edge node 30 and the controller 10 on the cloud 1 is shared between the edge nodes 30. Thus, the controller-side delay management table 38 is data basically the same between the edge nodes 30. An example of possible exception is a case where update fails because a message indicating a change in the one-way delay value (MQTT) fails to reach a certain edge node 30 due to network congestion.

Figure 14:
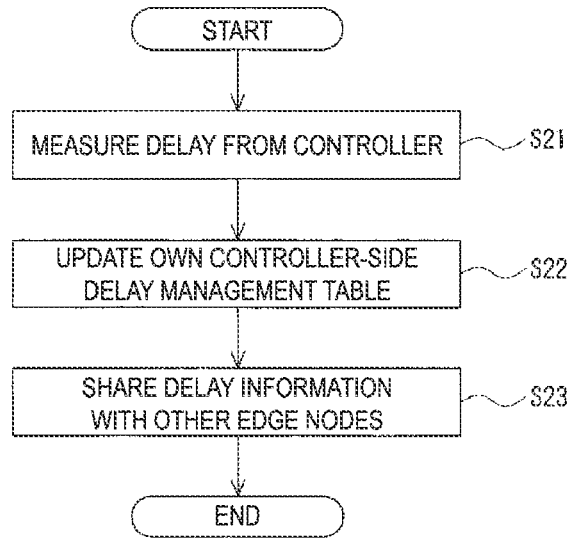
FIG. 14 is a flowchart of delay measurement and sharing in the edge node.

(4) Method of Periodically Measuring Delay Between Controller 10 and Edge Nodes 30 and Sharing Result This configuration technique (4) is mainly implemented by the delay measurement unit 34 of the timing control unit 33. FIG. 14 is a flowchart of delay measurement and sharing in the edge nodes 30.

As illustrated in FIG. 14, each edge node 30 measures Round Trip Time (RTT) between the controller 10 on the cloud 1 and the edge node 30 at a predetermined interval (every second for example) (step S21), and stores a value obtained by dividing the RTT value by 2 in the controller-side delay management table 38 of its memory as the one-way delay between the controller 10 and the edge node 30 as described above in the configuration technique (3) (step S22).

Furthermore, the edge nodes 30 share their respective one-way delay values at a predetermined interval (every second for example) (step S23). For example, this method is performed by Pub/Sub communications in cooperation with the MQTT broker server 50 provided on the cloud 1, for example. Other possible methods include Peer to Peer (P2P) communications (such as Web Real-Time Communications (WebRTC)) between the edge nodes 30 over the Internet and a token based communications over a ring network directly connecting the edge nodes 30 to each other.

The operation steps are as follows. In the following description, operations of a certain edge node 30 will be described. Each of edge nodes 30 operate asynchronously, and the operations of these edge nodes 30 are identical to the operation of the edge nodes 30 described above, and thus the details thereof will be omitted.

1. The edge node 30 registers itself in the MQTT broker server 50 on the cloud 1. Furthermore, it applies in advance for subscription for acquiring information required for operations of the present algorithm (for example, a topic name "oneway_delay_share").

2. The edge node 30 transmits an Internet Control Message Protocol (ICMP) Echo Request to a destination which is the IP address of the controller 10 on the cloud 1 that has been registered in advance.

3. The controller 10 on the cloud 1 transmits ICMP Echo Reply to the edge node 30, and the edge node 30 receives this.

4. The edge node 30 records, as the one-way delay between the controller 10 on the cloud 1 and the edge node 30, in the controller-side delay management table 38 of its memory, a value obtained by dividing a difference between a transmission timing of ICMP echo Request and a reception timing of ICMP Echo Reply by 2.

5. When the above step is completed, the edge node 30 immediately publishes the one-way delay value to the MQTT broker server 50 provided on the cloud 1. This is performed with QoS0.

6. When the above step is completed, the edge node 30 returns to step 2 described above after waiting for one second. Note that upon receiving the subscribing message from another edge node 30, that is, information update related to the one-way delay between the controller 10 on the cloud 1 and the edge node 30 from the MQTT broker server 50 during the waiting time period, the edge node 30 performs update on the item corresponding to the edge node 30 in the controller-side delay management table 38 on its memory.

(5) Method of Buffering at the Time of Arrival of Packet Related to Control Signal from Controller 10

When the controller 10 on the cloud 1 transmits a packet related to the control instruction to each controlled device 20, a group ID indicating the group including the controlled device 20 to be controlled is embedded in the packet. Specifically, the group ID is embedded as data within a Common Industrial Protocol (CIP), which is an application layer, when Ethernet/IP is used as described in Non Patent Literature 1. This allows the edge nodes 30 to recognize the presence of packets transmitted from the controller 20 on the cloud 1 to other controlled devices 20.

Figure 15:
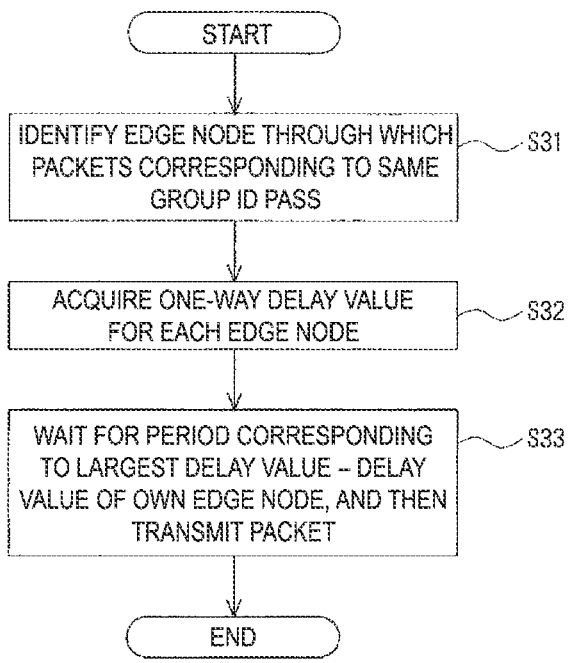
FIG. 15 is a flowchart of buffering in the edge node.

FIG. 15 is a flowchart of buffering in the edge node 30. As illustrated in FIG. 15, when the edge node 30 receives the packet related to the instruction and transfers the packet to the controlled device 20, the edge node 30 refers to the tables 35, 36, and 37 using the group ID as the key, to identify the edge node 30 through which the packets of the identical group ID pass (step S31).

The edge node 30 acquires, for each of the other edge nodes 30 through which the packets of the identical group ID pass, the one-way delay value registered in the controller-side delay management table 38 in its memory (step S32).

The edge node 30 refers to the controller-side delay management table 38, which is a list of one-way delay values, and performs packet transfer to the controlled device 20 (step S33) after waiting for a period of time corresponding to a value of (the largest one-way delay value)—(one-way delay value of the edge node 30).

Specific examples of buffering at the time of arrival of the packet will be described below. In the description herein, a specific example of a buffering performed on the basis of the status of the examples of the table mentioned in the description on the configuration technique (1). It is assumed that information registered in the tables of each edge node 30 indicate that one-way delay between the controller 10 on the cloud 1 and the edge node 30-1 is 80 ms, and that one-way delay between the controller 10 on the cloud 1 and the edge node 30-2 is 20 m. On the other hand, a situation is assumed, as the actual delay status, where one-way delay between the controller 10 on the cloud 1 and the edge node 30-1 is 79 ms, and one-way delay between the controller 10 on the cloud 1 and the edge node 30-2 is 21 ms.

The detailed operation steps are as follows. The following description encompasses both of the edge nodes 30-1 and 30-2 in charge of transfer of packets.

1. Control packets are transmitted to the controlled devices 20-1, 20-2, and 20-3, for the controller 10 on the cloud 1 to simultaneously operate the controlled devices 20-1, 20-2, and 20-3. Information "group ID1" is embedded in this control packet. These three packets are referred to as a packet 1, a packet 2, and a packet 3 in the following description.

2. The packet 3 arrives at the edge node 30-2, 21 ms after step 1 described above.

3. After step 2 described above, the edge node 30-2 refers to the content of the packet 3 and recognizes that the group ID is 1. Then, the edge node 30-2 refers to the group management table 35, and recognizes that the controlled devices 20 belonging to the group ID1 are the controlled devices 20-1, 20-2, and 20-3. The edge node 30-2 refers to the tables using, as a key, the IP address indicating the destination of the packet 3 to recognize that the destination is the controlled device 20-3, and recognizes that the edge node 30 corresponding to both of the remaining controlled devices 20-1 and 20-2 is the edge node 30-1. Because the one-way delay value of the edge node 30-1 is 80 ms and the one-way delay value of the edge node 30-2 is 20 ms, the edge node 30-2 determines to set waiting of 60 ms.

4. The packets 1 and 2 arrive at the edge node 30-1, 79 ms after step 1 described above. Since the packets 1 and 2 are independent packets, there may be a difference between arrival timings in a strict sense. In such a case, the subsequent procedure would be performed with the difference (the operations are independently performed on the packets 1 and 2). Here, the operations will be described assuming that the packets 1 and 2 arrive in this order, with these two packets arriving substantially simultaneously.

5. After step 4 described above, the edge node 30-1 refers to the content of the packet 1 and recognizes that the group ID is 1. Then, the edge node 30-1 refers to the group management table 35, and recognizes that the controlled devices belonging to the group ID1 are the controlled devices 20-1, 20-2, and 20-3. The edge node 30-1, recognizing that the destination of the packet 1 is the controlled device 20-1, recognizes that the edge nodes 30 corresponding to the remaining controlled devices 20-2 and 20-3 are respectively the edge nodes 30-1 and 30-2. Because the one-way delay value of the edge node 30-1 is 80 ms and the one-way delay value of the edge node 30-2 is 20 ms, the edge node 30-1 determines not to set waiting. The edge node 30-1 immediately transfers the packet 1.

6. Then, the edge node 30-1 refers to the content of the packet 2 and recognizes that the group ID is 1. Then, the edge node 30-1 refers to the group management table 35, and recognizes that the controlled devices belonging to the group ID1 are the controlled devices 20-1, 20-2, and 20-3. The edge node 30-1, recognizing that the destination of the packet 2 is the controlled device 20-2, recognizes that the edge nodes 30 corresponding to the remaining controlled devices 20-1 and 20-3 are respectively the edge nodes 30-1 and 30-2. Because the one-way delay value of the edge node 30-1 is 80 ms and the one-way delay value of the edge node 30-2 is 20 ms, the edge node 30-1 determines not to apply any wait. The edge node 30-1 immediately transfers the packet 2.

7. 4. The packets 1 and 2 arrive at the controlled devices 20-1 and 20-2, 80 ms after step 1 described above.

8. The edge node 30-2 transfers the packet 3 to the controlled device 20-3, 81 ms after step 1 described above.

9. The packet 3 arrives at the controlled device 20-3, 82 ms after step 1 described above.

Second Embodiment (Variation 1 of Scheme 1)

Next, a remote control system according to a second embodiment of the present invention will be described in detail. The present embodiment (Variation 1 of Scheme 1) is different from the first embodiment (Scheme 1) in that the delay is further measured between the edge nodes 30 and the controlled devices 20, and the packet transmission control is performed considering the delay. The other points are the same as those in the first embodiment, and therefore only the difference will be described here.

Variation 1 of Scheme 1 is mainly implemented by the following techniques: (1) a method of logically grouping controlled devices and managing a physical configuration in each edge node 30; (2) a method of generating the management Information and updating the information in response to a change in configuration; (3) a method of managing information about delay between the controller 10 and the edge nodes 30 in each edge node 30; (4) a method of periodically measuring delay between the controller 10 and the edge nodes 30 and sharing result; (5) a method of managing information about delay between the edge node 30 and the controlled device 20 in each edge node 30; (6) a method of periodically measuring delay between the edge node 30 and the controlled device 20 and sharing the result; and (7) a method of buffering at the time of arrival of instruction from the controller.

Figures 16, 17:
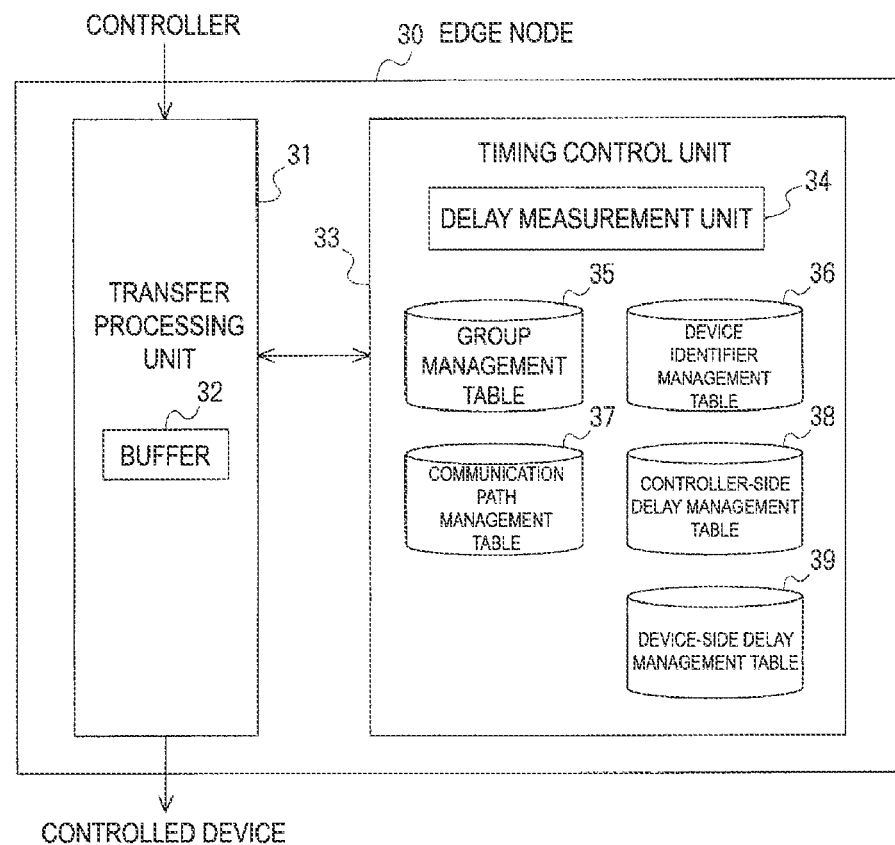
FIG. 16 is a functional block diagram illustrating an edge node according to a second embodiment.
FIG. 17 illustrates an example of a device-side delay management table.

As illustrated in FIG. 16, the remote control system according to the present embodiment includes a device-side delay management table 39 in addition to the configuration described in the first embodiment. In addition to the function of periodically measuring and recording the delay time between the host edge node 30 and the controller 10, the timing control unit 33 of the edge node 30 has a function of periodically measuring and recording the delay time between the host edge node 30 and the controlled device 20 thereunder. The timing control unit 33 communicates with the MQTT broker server 50 and informs the other edge nodes 30 of the measurement results. Similarly, the timing control unit 33 receives the notification from other edge nodes 30, and records the content therein. When calculating the buffering time, the timing control unit 33 performs the calculation considering the delay time between the edge node 30 and the controller 10 as well as the delay time between the edge node 30 and the controlled device 20.

The remote control system according to the present embodiment will be described below by describing the each of the configuration techniques (1) to (7) described above.

The configuration techniques (1) to (4) are the same as the configuration techniques (1) to (4) in the first embodiment, and thus description thereof is omitted herein.

(5) Method of Managing Information about Delay Between Edge Node 30 and Controlled Device 20 in Each Edge Node 30

The edge node 30 holds one-way delay between each edge node 30 and the controlled device 20 as the device-side delay management table 20. FIG. 17 illustrates an example of the device-side delay management table 39. The one-way delay value on the device-side delay management table 39 is updated continually according to the method in the configuration technique (6) described later.

Note that in the method described in the configuration technique (6) described later, a one-way delay value between each edge node 30 and the controlled device 20 is shared between the edge nodes 30. Thus, the device-side delay management table 39 is data basically identical between the edge nodes 30. An exception, for example, is a case where the update delays because a message indicating a change in the one-way delay value (MQTT) fails to reach a certain edge node 30 due to network congestion.

Figure 18:
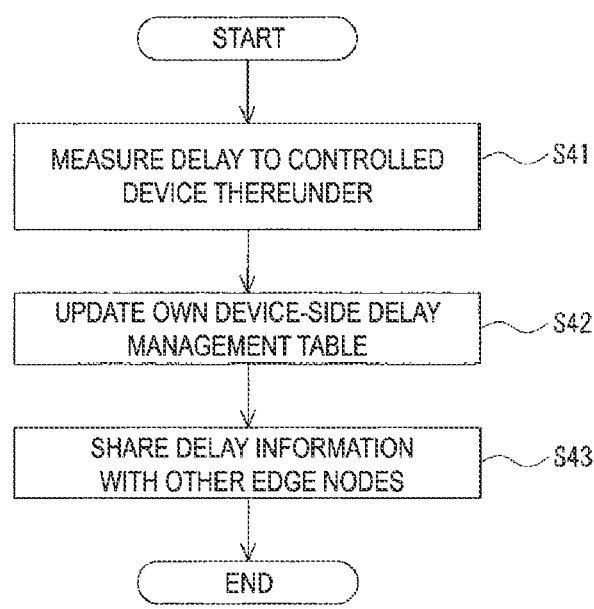
FIG. 18 is a flowchart of delay measurement and sharing in the edge node.

(6) Method of Periodically Measuring Delay Between Edge Nodes 30 and Controlled Devices 20 and Sharing Result This configuration technique (6) is mainly implemented by the delay measurement unit 34 of the timing control unit 33. FIG. 18 is a flowchart of delay measurement and sharing in the edge nodes 30.

As illustrated in FIG. 18, each edge node 30 measures RTT between the edge node 30 and the controlled device 20 thereunder at a predetermined interval (every second for example) (step S41), and stores a value obtained by dividing the RTT value by 2 in the device-side delay management table 39 of its memory as the one-way delay between the edge node 30 and the controlled device 20 as described above in the configuration technique (5) (step S42). Of course, only the one-way delay to the controlled device 20 thereunder is updated at this point.

Furthermore, the edge nodes 30 share their respective one-way delay values at a predetermined interval (every second for example) (step S43). For example, this method is performed by Pub/Sub communications performed in cooperation with the MQTT broker server 50 provided on the cloud 1, for example. Other possible methods include P2P communications (such as WebRTC) between the edge nodes 30 over the Internet and a token based communications over a ring network directly connecting the edge nodes 30 to each other.

The operation steps are as follows. In the following description, operations for a certain edge node 30 will be described. Each of edge nodes 30 operates asynchronously, and the operations of these edge nodes 30 are identical to the operation of the edge nodes 30 described above, and thus the details thereof will be omitted.

1. The edge node 30 registers itself in the MQTT broker server 50 on the cloud 1. Furthermore, it applies in advance for subscription for acquiring information required for operations of the present algorithm (for example, a topic name "EN_LOCAL_oneway_delay_share").

2. The edge node 30 refers to the communication path management table 37 described in the configuration technique (1), and generates a list of controlled devices 20 thereunder. Then, the edge node 30 refers to the device identifier management table 36 described in the configuration technique (1), and acquires the IP addresses of these controlled devices. The following steps 3 to 5 are repeated for the number of devices.

3. The edge node 30 transmits ICMP Echo Request to the controlled device 20.

4. The controlled device 20 transmits ICMP Echo Reply to the edge node 30, and the edge node 30 receives this.

5. The edge node 30 records as the one-way delay between the controlled device 20 and the edge node 30 in the device-side delay management table 39 of its memory, a value obtained by dividing a difference between a transmission timing of ICMP echo Request and a reception timing of ICMP Echo Reply by 2.

6. When the above step is completed, the edge node 30 immediately publishes the one-way delay value to the MQTT broker server 50 provided on the cloud 1. This is performed with QoS0.

7. When the above step is completed, the edge node 30 returns to step 2 described above after waiting for one second. Note that upon receiving, from the MQTT broker server 50, a message an edge node 30 is subscribing, that is, information update from another edge node related to the one-way delay between the edge node 30 and each of the controlled devices 20 thereunder during the waiting time period, the edge node 30 performs update on the item corresponding to the edge node 30 in the device-side delay management table 39 on its memory, (7) Method of Buffering at the Time of Arrival of Instruction from Controller When the controller 10 on the cloud 1 transmits a packet related to the control instruction to each controlled device 20, a group ID indicating the group including the controlled device 20 to be controlled is embedded in the packet. Specifically, the group ID is embedded as data within a CIP, which is an application layer, when Ethernet/IP is used as described in Non Patent Literature 1.

Figure 19:
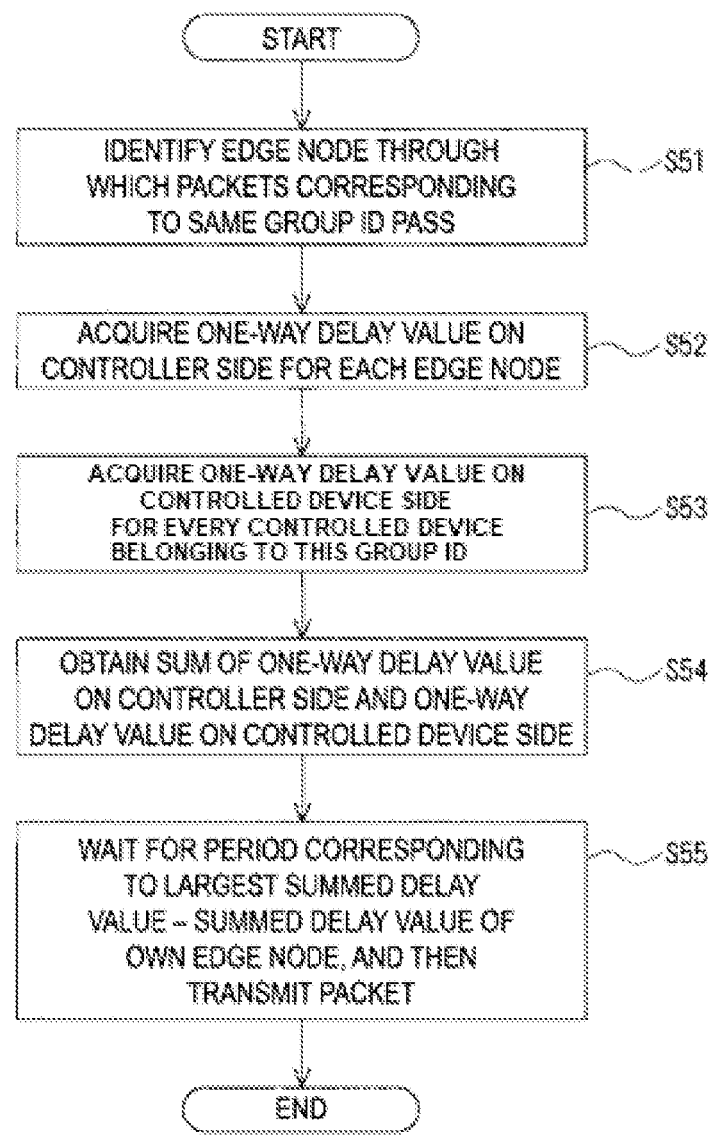
FIG. 19 is a flowchart of buffering in the edge node.

FIG. 19 is a flowchart of buffering in the edge node 30. As illustrated in FIG. 19, when the edge node 30 receives the instruction and transfers the packet to the controlled device 20, the edge node 30 refers to the tables 35, 36, and 37 using the group ID as the key, to acquire information indicating the edge node 30 through which the packets of the identical group ID pass (step S51).

The edge node 30 acquires, for each of the other edge nodes 30 through which the packets of the identical group ID, the one-way delay value between each edge node 30 and the controller 10 registered in the controller-side delay management table 38 in its memory (step S52). Furthermore, the edge node 30 acquires, for all of the controlled devices 20 belonging to the group ID, a one-way delay value between each edge node 30 and the controlled device 20 registered in the device-side delay management table 39 in its memory (step S53). Furthermore, the edge node 30 calculates the sum of the one-way delays between the controller 10, the edge node 30, and the controlled device 20, for each of all the controlled devices 20 belonging to the group ID (step S54).

The edge node 30 refers to the list of the summed values, waits for a time period corresponding to a difference that is calculated by (the largest sum of one-way delay values between controller 10, edge node 30, and controlled device 20)—(the summed one-way delay value among the controller 10, the edge node 30, and the controlled device 20 corresponding to the destination of the instruction packet received), and then transfers the packet to the controlled device 20 (step S55).

Specific examples of buffering at the time of arrival of the packet will be described below. The description herein is given on the basis of the status of the examples of the table mentioned in the description on the configuration technique (1). A situation is assumed where information indicating that one-way delay between the controller 10 on the cloud 1 and the edge node 30-1 is 80 ms, and one-way delay between the controller 10 on the cloud 1 and the edge node 30-2 is 20 m is registered in the tables of each edge node 30. On the other hand, a situation, as the actual delay status, is assumed where one-way delay between the controller 10 on the cloud 1 and the edge node 30-1 is 79 ms, and one-way delay between the controller 10 on the cloud 1 and the edge node 30-2 is 21 ms.

Furthermore, a situation is assumed, herein, where information indicating that one-way delay between the edge node 30-1 and the controlled device 20-1 and between the edge node 30-1 and the controlled device 20-2 is 1 ms, and one-way delay between the edge node 30-2 and the controlled device 20-3 is 5 ms is registered in the device-side delay management table 39 of each edge node 30. On the other hand, a situation is assumed, as the actual delay status, where the one-way delay between the edge node 30-1 and the controlled device 20-1 is 1 ms, the one-way delay between the edge node 30-1 and the controlled device 20-2 is 2 ms, and the one-way delay between the edge node 30-2 and the controlled device 20-3 is 5 ms.

The detailed operation steps are as follows. The following description encompasses both of the edge nodes 30-1 and 30-2 that transfer each packet.

1. Control packets are transmitted to the controlled devices 20-1, 20-2, and 20-3, for the controller 10 on the cloud 1 to simultaneously operate the controlled devices 20-1, 20-2, and 20-3. Information "group ID1" is embedded in this control packet. These three packets are referred to as a packet 1, a packet 2, and a packet 3 in the following description.

2. The packet 3 arrives at the edge node 30-2, 21 ms after step 1 described above.

3. After step 2 described above, the edge node 30-2 refers to the content of the packet 3 and recognizes that the group ID is 1. Then, the edge node 30-2 refers to the group management table 35, and recognizes that the controlled devices 20 belonging to the group ID1 are the controlled devices 20-1, 20-2, and 20-3. The edge node 30-2 refers to each table using, as a key, the IP address indicating the destination of the packet 3, and recognizes that the destination is the controlled device 20-3, and also recognizes that the edge node 30 corresponding to both of the remaining controlled devices 20-1 and 20-2 both is the edge node 30-1. The edge node 30-2 confirms that the one-way delay value of the edge node 30-1 is 80 ms, and the one-way delay value of the edge node 30-2 is 20 ms. Furthermore, the edge node 30-2 refers to the device-side delay management table 39 therein, and confirms that the one-way delay value between the edge node 30 and the controlled devices 20 corresponding to each of the controlled devices 20-1, 20-2, and 20-3 is 1 ms, 1 ms, and 5 ms respectively. This indicates that the summed one-way delay value corresponding to the packet 3 is 25 ms, whereas the summed one-way delay values corresponding to the controlled devices 20-1 and 20-2 are each 81 ms. Thus, the edge node 30-2 determines to set waiting of 56 ms.

4. The packets 1 and 2 arrive at the edge node 30-1, 79 ms after step 1 described above. Since the packets 1 and 2 are independent packets, there may be a difference between arrival timings in a strict sense. In such a case, the procedure thereafter is performed with the difference (the operations are independently performed on the packets 1 and 2). Here, the operations will be described assuming that the packets 1 and 2 arrive in this order, with these two packets arriving substantially simultaneously.

5. After step 4 described above, the edge node 30-1 refers to the content of the packet 1 and recognizes that the group ID is 1. Then, the edge node 30-1 refers to the group management table 35, and recognizes that the controlled devices 20 belonging to the group ID1 are the controlled devices 20-1, 20-2, and 20-3. The edge node 30-1, recognizing that the destination of the packet 1 is the controlled device 30-1, recognizes that the edge nodes corresponding to the remaining controlled devices 20-2 and 20-3 respectively are the edge nodes 30-1 and 30-22. The edge node 30-1 confirms that the one-way delay value of the edge node 30-1 is 80 ms, and the one-way delay value of the edge node 30-2 is 20 ms. Furthermore, the edge node 30-1 refers to the device-side delay management table 39 therein, and confirms that the one-way delay value between the edge node 30 and the controlled devices 20 corresponding to each of the controlled devices 20-1, 20-2, and 20-3 is respectively 1 ms, 1 ms, and 5 ms. This indicates that the summed one-way delay value corresponding to the packet 1 is 81 ms, whereas the summed one-way delay values corresponding to the controlled devices 20-1 and 20-2 are 81 ms and 25 ms, respectively. Thus, the edge node 30-1 determines not to set waiting. The edge node 30-1 immediately transfers the packet 1.

6. Then, the edge node 30-1 refers to the content of the packet 2 and recognizes that the group ID is 1. Then, the edge node 30-1 refers to the group management table 35, and recognizes that the controlled devices 20 belonging to the group ID1 are the controlled devices 20-1, 20-2, and 20-3. The edge node 30-1, recognizing that the destination of the packet 2 is the controlled device 20-2, recognizes that the edge nodes 30 corresponding to the remaining controlled devices 20-1 and 20-3 respectively are the edge nodes 30-1 and 30-2. The edge node 30-2 confirms that the one-way delay value of the edge node 30-1 is 80 ms, and the one-way delay value of the edge node 30-2 is 20 ms. Furthermore, the edge node 30-1 refers to the device-side delay management table 39 therein, and confirms that the one-way delay value between the edge node 30 and the controlled devices 20 corresponding to each of the controlled devices 20-1, 20-2, and 20-3 is respectively 1 ms, 1 ms, and 5 ms. This indicates that the summed one-way delay value corresponding to the packet 2 is 81 ms, whereas the summed one-way delay values corresponding to the controlled devices 20-1 and 20-2 are 81 ms and 25 ms, respectively. Thus, the edge node 30-1 determines not to se waiting. The edge node 30-1 immediately transfers the packet 2.

7. The edge node 30-2 transfers the packet 3 to the controlled device 20-3, 77 ms after step 1 described above.

8. The packet 1 arrives at the controlled device 20-1, 80 ms after step 1 described above.

9. The packet 2 arrives at the controlled device 20-2, 81 ms after step 1 described above.

10. The packet 3 arrives at the controlled device 20-3, 82 ms after step 1 described above.

Third Embodiment (Variation 2 of Scheme 1)

Next, a remote control system according to a third embodiment of the present invention will be described in detail. The present embodiment (Variation 2 of Scheme 1) is different from the first embodiment (Scheme 1) in that the one-way delay value measurement is performed at the time of arrival of the control packet in addition to or instead of being periodically performed. The other points are the same as those in the first embodiment, and therefore only the difference will be described here.

According to the present scheme, buffering control is performed for currently arrived control packet using the one-way delay value that has already been registered, and the one-way delay value is updated for subsequent communications.

In the present Variation 2, first of all, subscription registration is performed with the MQTT broker server 50 using a predetermined topic name (for example, START_delay_measure) as a preparatory phase before the control packet arrives at the edge node 30. Then, when the control packet arrives at a certain edge node 30, each edge node 30 performs the following process.

When a certain control packet arrives, the packet is transferred in accordance with the method according to Scheme 1 or Variation 1 of Scheme 1.

Then, the edge node 30 publishes a message indicating the arrival of the control packet using the topic name described above. Furthermore, the edge node 30 performs measurement and sharing of the one-way delay.

Each edge node 30 that has received the message performs measurement and sharing of the one-way delay.

Note that in the above-described scheme, the measurement and sharing of the one-way delay are duplicated for the number of control packets transmitted to the identical group. To avoid the resultant wasteful consumption of resources, the edge node 30 may additionally perform the following operations.

When the measurement and sharing of the one-way delay has been performed within a past predetermined period of time (100 ms for example), the edge node 30 does not newly perform the measurement and sharing of the one-way delay.

Figure 20:
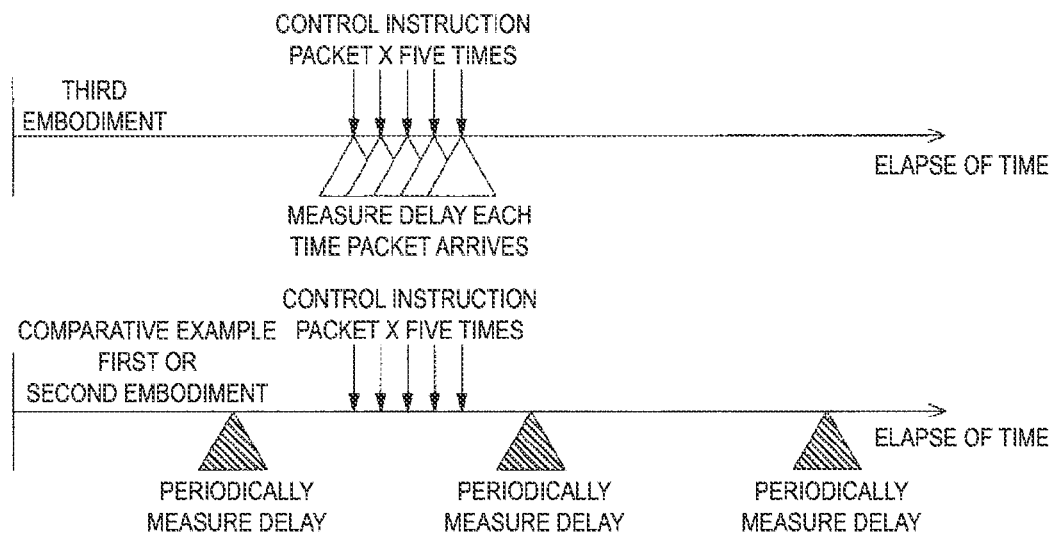
FIG. 20 is a diagram illustrating an effect of a third embodiment.

As illustrated in FIG. 20, in the present Variation 2, when the control packet arrives at an interval shorter than the periodic measurement time interval, the old measurement result is rewritten and updated so that the processing can be executed with higher accuracy on the second and subsequent instruction packets.

Fourth Embodiment (Scheme 2)

Figure 21:
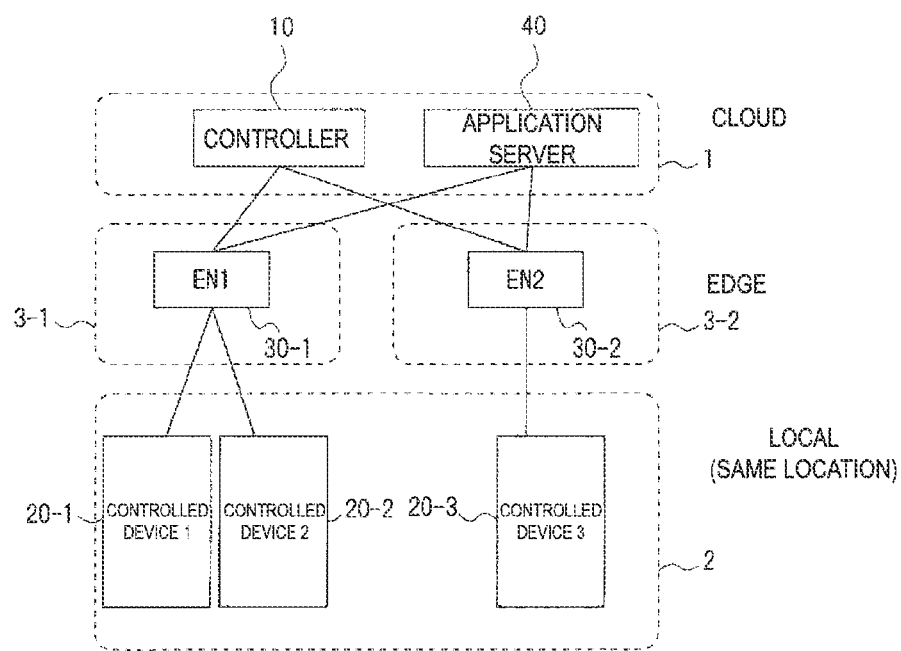
FIG. 21 is a diagram illustrating a configuration of a remote control system according to a fourth embodiment.

Next, a remote control system according to a fourth embodiment of the present invention will be described in detail with reference to FIG. 21. FIG. 21 is a diagram illustrating a configuration of the remote control system according to the fourth embodiment of the present invention. Note that components that are the same as those in the overview of the present invention described above are denoted by the same reference numerals.

Scheme 2 includes the following techniques: (1) a method of logically grouping controlled devices and managing a physical configuration in each edge node 30; (2) a method of generating the management Information and updating the information in response to a change in configuration; (3) a method of synchronizing time between edge nodes 30 in each edge node 30 (using existing technique); and (4) a method of synchronized control through cooperation between the edge nodes 30 at the time of arrival of the packet related to the control signal from the controller 10.

As described above, Scheme 2 is about the synchronized control performed at the time of arrival of the control packet from the controller 10, and thus the real-time property is compromised. Still, the scheme is free from influence of fluctuation of delay between the cloud 1 and the edge 3 (jitter), and thus is effective in a case where the jitter between the cloud 1 and the edge 3 is large.

As illustrated in FIG. 21, the remote control system according to the present embodiment includes: a controller 10 arranged in a cloud 1; a plurality (three in FIG. 21) of controlled devices 20 disposed in a local 2, edge nodes 30 disposed in a plurality of (two in FIG. 21) respective edges 3, which are networks for connecting the controlled device 20 with a controller 10; and an application server 40 that is provided on the cloud 1, and serves as an adjustment device for adjusting the packet transmission time among the controlled devices 20. Note that in FIG. 21, the application server 40 is deployed on the cloud 1, but may be deployed at any position as long as it can communicate with the edge nodes 30.

The application server 40 has the following functions: (a) a function of receiving, from the edge node 30 that has received the packet related to the control instruction from the controller 10, information indicating the reception, a group ID included in the control instruction, and the information on the edge node 30 to which the controlled device 20 corresponding to the group ID is connected (including the number of controlled devices 20 under the edge node 30); (h) a function of waiting for the same number of notifications from the edge node 30 as the number of controlled devices 20 corresponding to the group ID on the basis of the information described above; (c) a function of designating a time point after a predetermined period from the arrival of the notifications corresponding to the number of the controlled devices 20 from the edge node 30, and designating a packet transfer execution time point for each edge node 30 and (d) a function of performing time synchronization by the NTP protocol.

Figure 22:
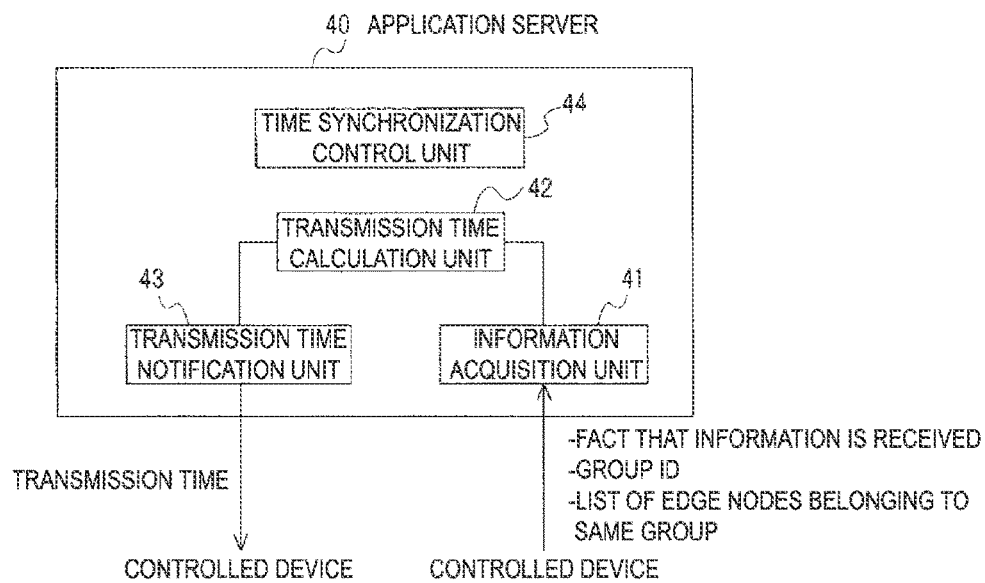
FIG. 22 is a functional block diagram of an application server according to a fourth embodiment.

To implement the functions described above, the application server 40 includes an information acquisition unit 41 having the function (a), a transmission time calculation unit 42 having the functions (b) and (c), a transmission time notification unit 43 having a part of the function (c), and a time synchronization control unit 44 having the function (d) as illustrated in FIG. 22.

The edge nodes 30 are interposed between the controller 10 and the controlled devices 20, and have the following functions: (a) a function of transferring the packets between the controller 10 and the controlled device 20, particularly, a function of transferring a packet, received from the controller 10, at a predetermined time point on the basis of an instruction from the application server 40; (c) a function of transmitting, when the packet related to the control instruction is received from the controller 10, information indicating the reception, a group ID included in the control instruction, and the information on the edge node 30 to which the controlled device 20 corresponding to the group ID is connected (including the number of controlled devices 20 under the edge node 30) to the application server 40; and (d) a function of performing time synchronization by the NTP protocol.

Figure 23:
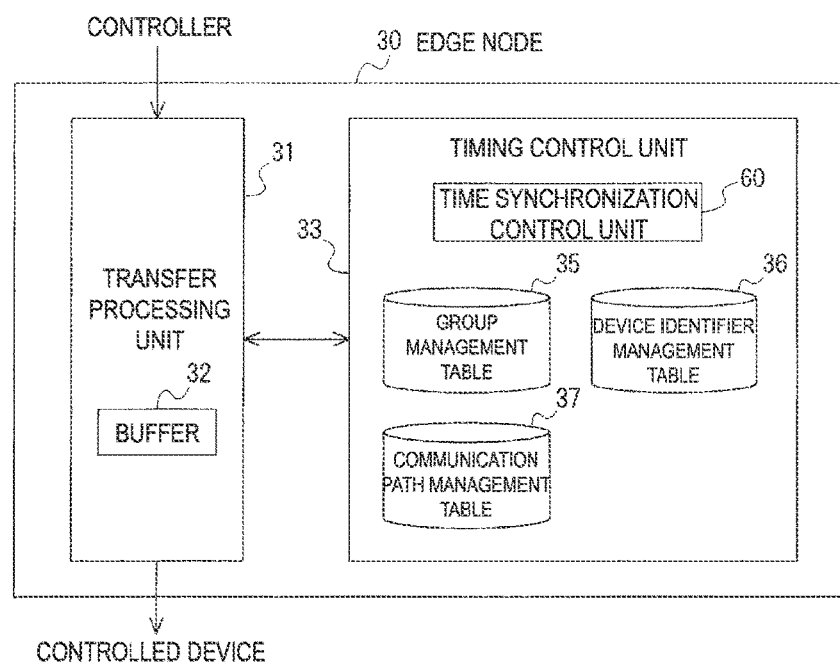
FIG. 23 is a functional block diagram illustrating an edge node according to the fourth embodiment.

To implement the above-described functions, the edge node 30 includes a transfer processing unit 31 and a timing control unit 33, as illustrated in FIG. 23. The transfer processing unit 31 has the function (a) and includes a buffer 32. The timing control unit 33 has the functions (b) and (d), and includes a group management table 35, a device identifier management table 36, a communication path management table 37, and a time synchronization control unit 60.

The remote control system according to the present embodiment will be described below by describing the each of the configuration techniques (1) to (4) described above. The configuration techniques (1) and (2) are the same as the configuration techniques (1) and (2) in the first embodiment, and thus description thereof is omitted herein.

(3) Method of Synchronizing Time Among Edge Nodes 30 in Each Edge Node 30 In the present configuration technique 3, each edge node 30 and the application server 40 acquire accurate time information from a predetermined NTP server (not illustrated) through a time synchronization method using a known NTP.

Specific sequence of operations is as follows. The following description is given on the application server 40 and a certain edge node 30. For other edge nodes 30, similar operations are performed independently.

The edge node 30 and the application server 40 use the known NTP client to perform the time synchronization with the NTP server (not illustrated) on the cloud 1, periodically (e.g., once a minute for example) or at any time. The NTP server is deployed on the cloud 1, but the deployment position is not particularly limited as long as communications with the edge nodes 30 and the application server 40 can be performed.

(4) Method of Controlling Synchronization Through Cooperation Among Edge nodes 30 at the Time of Arrival of Packet Related to Control Signal from Controller 10

When the controller 10 on the cloud 1 transmits a packet related to the control instruction to each controlled device 20, a group ID indicating the group including the controlled device 20 to be controlled is embedded in the packet. Specifically, the group ID is embedded as data within a CIP, which is an application layer, when Ethernet/IP is used as described in Non Patent Literature 1.

Figure 24:
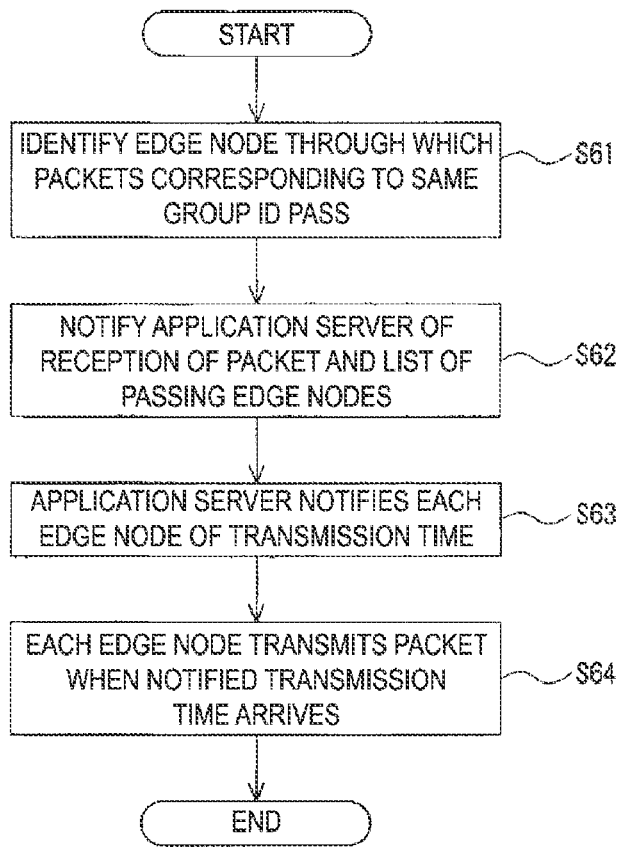
FIG. 24 is a flowchart of synchronization control in the edge node and the application server.

FIG. 23 illustrates a flowchart of synchronization control in the edge node 30 and the application server 40. As illustrated in FIG. 24, when the edge node 30 receives the packet related to the instruction and transfers the packet to the controlled device 20, the edge node 30 refers to the tables 35, 36, and 37 using the group ID as a key, to acquire information indicating the edge node 30 through which the packets of the identical group ID pass (step S61).

The edge node 30 notifies the application server 40 of the information indicating the reception of the packet related to the instruction and the list of edge nodes 30 (step S62). The other edge nodes 30 operate similarly.

The application server 40 transmits predetermined time in response to the each edge node 30, upon receiving the notification from all the corresponding edge nodes 30 (step S63).

Each edge node 30 performs packet transfer to the controlled device at the predetermined time informed by the application server 40 (step S64).

Specific examples of the synchronization control method at the time of arrival of the packet will be described below. The description herein is given on the basis of the status of the examples of the table mentioned in the description on the configuration technique (1). On the other hand, a situation is assumed, as the actual delay status, where the one-way delay between the controller 10 on the cloud 1 and the edge node 30-1 is 79 ms, and the one-way delay between the controller 10 on the cloud 1 and the edge node 30-2 is 21 ms. The one-way delay between the application server 40 and the edge nodes 30-1 and 30-2 are assumed to be 100 ms and 30 ms respectively.

The detailed operation steps are as follows. The following description encompasses both of the edge nodes 30-1 and 30-2.

1. Control packets are transmitted to the controlled devices 20-1, 20-2, and 20-3, for the controller 10 on the cloud 1 to simultaneously operate the controlled devices 20-1, 20-2, and 20-3. Information "group ID1" is embedded in this control packet. These three packets are referred to as a packet 1, a packet 2, and a packet 3 in the following description. The following description will be given assuming that T represents the time at which the packet is transmitted from the controller 10 on the cloud 1.

2. The packet 3 arrives at the edge node 30-2, 21 ms after time T.

3. After step 2 described above, the edge node 30-2 refers to the content of the packet 3 and recognizes that the group ID is 1. Then, the edge node 30-2 refers to the group management table 35, and recognizes that the controlled devices 20 belonging to the group ID1 are the controlled devices 20-1, 20-2, and 20-3. The edge node 30-2 refers to the tables using, as a key, the IP address indicating the destination of the packet 3 to recognize that the destination is the controlled device 20-3, and recognizes that the edge node 30 corresponding to both of the remaining controlled devices 20-1 and 20-2 is the edge node 30-1. The edge node 30-2 notifies the application server 40 of the information indicating the reception of the control instruction corresponding to the group ID1 and indicating that the edge nodes 30 belonging to the group ID1 are the edge node 30-2 (the number of controlled devices=1) and the edge node 30-1 (the number of controlled devices=2).

4. The application server 40 receives the notification, 51 ms after time T. With the content of this notification, the application server 40 recognizes that the edge nodes 30 belonging to the group ID1 are the edge node 30-2 (the number of controlled devices=1) and the edge node 30-1 (the number of controlled devices=2), and starts waiting for the arrival of the message from the edge node 30-1.

5. The packets 1 and 2 arrive at the edge node 30-1, 79 ms after time T. Since the packets 1 and 2 are independent packets, there may be a difference between arrival timings in a strict sense. In such a case, the procedure thereafter is performed with the difference (the operations are independently performed on the packets 1 and 2). Here, the operations will be described assuming that the packets 1 and 2 arrive in this order, with these two packets arriving substantially simultaneously.

6. After step 5 described above, the edge node 30-1 refers to the content of the packet 1 and recognizes that the group ID is 1. Then, the edge node 30-1 refers to the group management table 35, and recognizes that the control devices 20 belonging to the group ID1 are the controlled devices 20-1, 20-2, and 20-3. The edge node 30-1 refers to the tables using, as a key, the IP address indicating the destination of the packet 1, recognizes that the destination is the controlled device 20-1, and recognizes that the edge nodes corresponding to the remaining controlled devices 20-2 and 20-3 are respectively the edge nodes 30-1 and 30-2. The edge node 30-1 notifies the application server 40 of the information indicating the reception of the control instruction corresponding to the group ID1 and indicating that the edge nodes 30 belonging to the group ID are the edge node 30-1 (the number of controlled devices=2) and the edge node 30-2 (the number of controlled devices=1).

7. After step 6 described above, the edge node 30-1 performs an operation that is similar to that in step 6 on the packet 2.

8. The notification issued from the edge node 30-1 to the application server 40 in step 6 described above arrives at the application server 40, 179 ms after time T. The application server 40 that has received the notification recognizes that one notification from the edge node 30-1 among the edge nodes 30 belonging to the group ID has not arrived yet, and continues to wait.

9. Then, the notification issued to the application server 40 from the edge node 30-1 in step 7 described above arrives at the application server 40 immediately after step 8 described above, 179 ms after time T. The application server 40 that has received the notification recognizes that one notification and two notifications have respectively arrived from the edge node 30-2 and the edge node 30-1 among the edge nodes 30 belonging to the group ID, and thus recognizes that all the notifications have arrived.

10. After step 9 described above, the application server 40 issues notifications to the edge node 30-1 and the edge node 30-2, so that the packet transfer from the edge node 30 to the controlled device 20 starts 1179 ms after time T, which is after a waiting time set in advance (which is assumed to be one second herein for example).

11. The notification arrives at the edge node 30-2, after 209 ms after time T. The edge node 30-2 starts to wait until the designated time.

12. The notification arrives at the edge node 30-1, after 279 ms after time T. The edge node 30-1 starts to wait until the designated time.

13. The edge nodes 30-1 and 30-2 start the packet transfer to the controlled devices 20-1, 20-2, and 20-3, 1179 ms after time T.

14. The packet arrives at the controlled devices 20-1, 20-2, and 20-3, 1180 ms after time T.

An overview and embodiments of the present invention are described in detail above, but the present invention is not limited thereto. For example, in the present invention, the packet transfer device provided with the packet transfer processing unit and the timing control unit is arranged in the communication carrier network as an edge node, but as described above, the deployment position is not particularly limited.

The data structure of each table and the protocols for information sharing among edge nodes in the embodiments are merely examples, and the present invention is applicable using other data structures and protocols.

REFERENCE SIGNS

1 Cloud
2 Local
3 Edge
10 Controller
20 Controlled device
30 Edge node
31 Transfer processing unit
32 Buffer
33 Timing control unit
34 Delay measurement unit
35 Group management table
36 Device identifier management table
37 Communication path management table
38 Controller-side delay management table
39 Device-side delay management table
40 Application server
41 Information acquisition unit
42 transmission time calculation unit
43 Transmission time notification unit
44 Time synchronization control unit
50 MQTT broker server
60 Time synchronization control unit

The invention claimed is:

1. A remote control system comprising:
a plurality of controlled devices provided in a location;
a controller provided on a network and configured to transmit a packet related to a control signal in real time to control the controlled devices; and
a single packet transfer device provided on a first communication path included in one or more communication paths formed between the controller and the plurality of controlled devices,
wherein the single packet transfer device
is configured to:
receive a first packet included in a plurality of packets simultaneously transmitted from the controller to the controlled devices, wherein the first packet is associated with a first packet delay time between the single packet transfer device and the controller;
receive a second packet delay time from a second packet transfer device deployed on a second communication path different from the first communication path, wherein the second packet delay time is i) for a second packet included in the plurality of packets, and ii) between the second packet transfer device and the controller;
determine and control transmission timing of the first packet based on the first packet delay time and the second packet delay time to reduce a difference in arrival time, at the plurality of controlled devices, of the plurality of packets; and
transfer the first packet according to the transmission timing.

2. The remote control system according to claim 1, wherein the single packet transfer device is configured to control the transmission timing of the first packet, further based on a third packet delay time between the single packet transfer device and the controlled devices, and a fourth packet delay time between the second packet transfer device and the controlled devices, the fourth packet delay time being received by the single packet transfer device from the second packet transfer device.

3. The remote control system according to claim 1, wherein the single packet transfer device is configured to acquire each packet delay time periodically, or when the first packet is received from the controller, or both.

4. The remote control system according to claim 1, further comprising an adjustment device provided on the network and configured to instruct packet transmission time from the single packet transfer device,
wherein the single packet transfer device is configured to:
notify, upon receiving the first packet from the controller, the adjustment device of the reception,
receive, from the adjustment device, the packet transmission time, and
transmit the first packet at the packet transmission time.

5. The remote control system according to claim 1, wherein
the controller is configured to provide a group identifier, indicating the plurality of controlled devices that are targets of timing control by the single packet transfer device, to a packet destined to the plurality of controlled devices, and
the single packet transfer device is configured to perform the timing control when the group identifier is included in the packet received from the controller.

6. The remote control system according to claim 1, wherein the plurality of controlled devices provided in the location each include an active communication unit configured to form an active communication path and an auxiliary communication unit configured to form an auxiliary communication path, wherein
the single packet transfer device is provided on the active communication path and on the auxiliary communication path.

7. A packet control method for a remote control system comprising a plurality of controlled devices provided in a location, a controller provided on a network and configured to transmit a packet related to a control signal in real time to control the controlled devices, and a single packet transfer device provided on a first communication path included in one or more communication paths formed between the controller and the plurality of controlled devices, the method comprising:
receiving, by the single packet transfer device, a first packet included in a plurality of the packets simultaneously transmitted from the controller to the controlled devices, wherein the first packet is associated with a first packet delay time between the single packet transfer device and the controller;
receive, by the single packet transfer device, a second packet delay time from a second packet transfer device deployed on a second communication path different from the first communication path, wherein the second packet delay time is i) for a second packet included in the plurality of packets, and ii) between the second packet transfer device and the controller;
determining, by the single packet transfer device, transmission timing of the first packet based on the first packet delay time and the second packet delay time to reduce a difference in arrival time, at the plurality of controlled devices, of the plurality of the packets; and
transmitting, by the single packet transfer device, the first packet received from the controller to a corresponding controlled device at the transmission timing.

8. The packet control method according to claim 7, further comprising:
determining and controlling, by the single packet transfer device, the transmission timing of the first packet, further based on a third packet delay time between the single packet transfer device and the controlled devices, and a fourth packet delay time between the second packet transfer device and the controlled devices, the fourth packet delay time being received by the single packet transfer device from the second packet transfer device.

9. The packet control method according to claim 7, further comprising:
acquiring, by the single packet transfer device, each packet delay time periodically, or when the first packet is received from the controller, or both.

10. The packet control method according to claim 7, wherein the remote control system further comprises an adjustment device provided on the network and configured to instruct packet transmission time from the single packet transfer device,
the method further comprising:
notifying, by the single packet transfer device, upon receiving the first packet from the controller, the adjustment device of the reception;
receiving, by the single packet transfer device from the adjustment device, the packet transmission time; and
transmitting, by the single packet transfer device, the first packet at the packet transmission time.

11. The packet control method according to claim 7, further comprising:
providing, by the controller, a group identifier, indicating the plurality of controlled devices that are targets of timing control by the single packet transfer device, to a packet destined to the plurality of controlled devices; and
performing, by the single packet transfer device, the timing control when the group identifier is included in the packet received from the controller.

12. The packet control method according to claim 7, wherein the plurality of controlled devices provided in the location each include an active communication unit configured to form an active communication path and an auxiliary communication unit configured to form an auxiliary communication path, wherein
the single packet transfer device is provided on the active communication path and on the auxiliary communication path.

* * * * *